United States Patent
Ramani et al.

(10) Patent No.: US 11,616,246 B2
(45) Date of Patent: Mar. 28, 2023

(54) MICROSCALE-BIPOLAR-INTERFACE-ENABLED PH GRADIENTS IN ELECTROCHEMICAL DEVICES

(71) Applicants: Vijay K. Ramani, St. Louis, MO (US); Zhongyang Wang, St. Louis, MO (US); Javier Parrondo, St. Louis, MO (US); Shrihari Sankarasubramanian, St. Louis, MO (US)

(72) Inventors: Vijay K. Ramani, St. Louis, MO (US); Zhongyang Wang, St. Louis, MO (US); Javier Parrondo, St. Louis, MO (US); Shrihari Sankarasubramanian, St. Louis, MO (US)

(73) Assignee: Washington University, St. Louis, MO (US)

( * ) Notice: Subject to any disclaimer, the term of this patent is extended or adjusted under 35 U.S.C. 154(b) by 529 days.

(21) Appl. No.: 16/379,212

(22) Filed: Apr. 9, 2019

(65) Prior Publication Data

US 2019/0312293 A1  Oct. 10, 2019

Related U.S. Application Data

(60) Provisional application No. 62/654,870, filed on Apr. 9, 2018.

(51) Int. Cl.
*H01M 8/083* (2016.01)
*H01M 8/1004* (2016.01)

(52) U.S. Cl.
CPC ......... *H01M 8/083* (2013.01); *H01M 8/1004* (2013.01); *H01M 2300/0014* (2013.01); *H01M 2300/0082* (2013.01)

(58) Field of Classification Search
None
See application file for complete search history.

(56) References Cited

U.S. PATENT DOCUMENTS

| 5,523,177 | A | * | 6/1996 | Kosek | H01M 8/1004 |
| | | | | | 429/480 |
| 8,809,483 | B1 | * | 8/2014 | Hibbs | C08G 61/10 |
| | | | | | 521/27 |
| 8,895,196 | B2 | | 11/2014 | Unlu et al. | |
| 9,065,095 | B2 | | 6/2015 | Markoski et al. | |
| 9,455,450 | B2 | | 9/2016 | Cipollini et al. | |
| 9,537,156 | B2 | * | 1/2017 | Kim | H01M 8/1004 |
| 9,853,317 | B2 | | 12/2017 | Tsai et al. | |
| 9,917,323 | B2 | | 3/2018 | Yan et al. | |
| 2015/0064581 | A1 | * | 3/2015 | Unlu | H01M 8/1023 |
| | | | | | 429/414 |

OTHER PUBLICATIONS

Noble Metals: Definition, List, Properties, and Examples, ScienceABC, 2021 (Year: 2021).*
Park,Y.-C., Tokiwa, H., Kakinuma, K., Watanabe, M., Uchida, M.—Effects of carbon supports on Pt distribution, ionomer coverage and cathode performance for polymer electrolyte fuel cells, Journal of Power Sources 315 (2016) 179-191 (Year: 2016).*
Arges C. G. et al. (2012), Assessing the influence of different cation chemistries on ionic conductivity and alkaline stability of anion exchange membranes, Journal of Materials Chemistry, vol. 22, No. 9, pp. 3733-3744.
Arges C. G. et al. (2013), Investigation of Cation Degradation in Anion Exchange Membranes Using Multi-Dimensional NMR Spectroscopy, Journal of The Electrochemical Society, vol. 160, No. 9, pp. F1006-F1021.
Arges C. G. et al. (2013), Best Practices for Investigating Anion Exchange Membrane Suitability for Alkaline Electrochemical Devices: Case Study Using Quaternary Ammonium Poly(2,6-dimethyl 1,4-phenylene)oxide Anion Exchange Membranes, J. Electrochem. Soc., vol. 160, No. 11, pp. F1258-F1274.
Arges C.G. et al. (2014), Bipolar polymer electrolyte interfaces for hydrogen-oxygen and direct borohydride fuel cells, *International Journal of Hydrogen Energy*, vol. 39, No. 26, pp. 14312-14321.
Atwan M.H. et al. (2006), Colloidal Au and Au-alloy catalysts for direct borohydride fuel cells: Electrocatalysis and fuel cell performance, Journal of Power Sources, vol. 158, No. 1, pp. 36-44.
Behmenyar G. et al. (2014), Investigation of carbon supported Pd—Cu nanoparticles as anode catalysts for direct borohydride fuel cell, Journal of Power Sources, vol. 249, pp. 239-246.
Boyaci San F.G. et al. (2014), Evaluation of operating conditions on DBFC (direct borohydride fuel cell) performance with PtRu anode catalyst by response surface method, Energy, vol. 71, pp. 160-169.
Carmo M. et al. (2013), A comprehensive review on PEM water electrolysis, International Journal of Hydrogen Energy, vol. 38, No. 12, pp. 4901-4934.
Celik C. et al. (2010), Improving the direct borohydride fuel cell performance with thiourea as the additive in the sodium borohydride solution, International Journal of Hydrogen Energy, vol. 35, No. 16, pp. 8678-8682.

(Continued)

*Primary Examiner* — Anca Eoff

(57) ABSTRACT

Among the various aspects of the present disclosure is the provision of method of inducing or providing a pH gradient in electrochemical or chemical systems. Briefly, the pH gradient is induced by use of coated particles or films with an ion exchange ionomer.

19 Claims, 13 Drawing Sheets

(56) References Cited

OTHER PUBLICATIONS

Çelikkan H. et al. (2007), the investigation of the electrooxidation of sodium borohydride on various metal electrodes in aqueous basic solutions, International Journal of Hydrogen Energy, vol. 32, No. 5, pp. 588-593.

Chatenet M. et al. (2006), Kinetics of sodium borohydride direct oxidation and oxygen reduction in sodium hydroxide electrolyte: Part I. BH4—electro-oxidation on Au and Ag catalysts, Electrochimica Acta, vol. 51, No. 25, pp. 5459-5467.

Cheng H. et al. (2006), Influence of operation conditions on direct borohydride fuel cell performance, Journal of Power Sources, vol. 160, No. 1, pp. 407-412.

Cheng H. et al. (2006), Investigation of Ti mesh-supported anodes for direct borohydride fuel cells, Journal of Applied Electrochemistry, vol. 36, No. 12, pp. 1361-1366.

Cheng H. et al. (2006), Material Aspects of the Design and Operation of Direct Borohydride Fuel Cells, Fuel Cells, vol. 6, No. 5, pp. 367-375.

Cheng H. et al. (2007), Evaluation of new ion exchange membranes for direct borohydride fuel cells, Journal of Membrane Science, vol. 288, No. 1, pp. 168-174.

Chuy C. et al. (2003), Conductivity and Electrochemical ORR Mass Transport Properties of Solid Polymer Electrolytes Containing Poly(styrene sulfonic acid) Graft Chains, Journal of The Electrochemical Society, vol. 150, No. 5, pp. E271-E279.

Coowar F.A. et al. (2008) Electrochemical oxidation of borohydride at nano-gold-based electrodes: Application in direct borohydride fuel cells, Journal of Power Sources, vol. 175, No. 1, pp. 317-324.

Duteanu N. et al. (2007), A parametric study of a platinum ruthenium anode in a direct borohydride fuel cell, Journal of Applied Electrochemistry, vol. 37, No. 9, pp. 1085-1091.

Geng X. et al. (2008), Ni—Pt/C as anode electrocatalyst for a direct borohydride fuel cell, Journal of Power Sources, vol. 185, No. 2, pp. 627-632.

Geng X. et al. (2010), Borohydride electrochemical oxidation on carbon-supported Pt-modified Au nanoparticles, Journal of Power Sources, vol. 195, No. 6, pp. 1583-1588.

Grigoriev S.A. et al. (2006), Pure hydrogen production by PEM electrolysis for hydrogen energy, International Journal of Hydrogen Energy vol. 31, No. 2, pp. 171-175.

Gu L. et al. (2007), Cathode electrocatalyst selection and deposition for a direct borohydride/hydrogen peroxide fuel cell, Journal of Power Sources, vol. 173, No. 1, pp. 77-85.

Gyenge E. et al. (2006), Electrocatalysis of Borohydride Oxidation on Colloidal Pt and Pt-Alloys (Pt—Ir, Pt—Ni, and Pt—Au) and Application for Direct Borohydride Fuel Cell Anodes, Journal of The Electrochemical Society, vol. 153, No. 1, pp. A150-A158.

He C. et al. (2017), Pt/RuO2-TIO2 Electrocatalysts Exhibit Excellent Hydrogen Evolution Activity in Alkaline Media, Journal of The Electrochemical Society, vol. 164, No. 12, pp. F1234-F1240.

Herman H. et al. (2003), The radiation-grafting of vinylbenzyl chloride onto poly(hexafluoropropylene-co-tetrafluoroethylene) films with subsequent conversion to alkaline anion-exchange membranes: optimisation of the experimental conditions characterisation, Journal of Membrane Science, vol. 218, No. 1-2, pp. 147-163.

Huang C-C. et al. (2013), Direct borohydride fuel cell performance using hydroxide-conducting polymeric nanocomposite electrolytes, Journal of Polymer Science Part B: Polymer Physics, vol. 51, No. 24, pp. 1779-1789.

Iyigün KaradağÇ. et al. (2015), Investigation of Carbon Supported Nanostructured PtAu Alloy as Electrocatalyst for Direct Borohydride Fuel Cell, Fuel Cells, vol. 15, No. 2, pp. 262-269.

Jung M-S.J. et al. (2011), A perfluorinated anion exchange membrane with a 1,4-dimethylpiperazinium cation, Journal of Materials Chemistry, vol. 21, No. 17, pp. 6158-6160.

Jung M.-S.J. et al. (2013), Polysulfone-based anion exchange membranes demonstrate excellent chemical stability and performance for the all-vanadium redox flow battery, Journal of Materials Chemistry A, vol. 1, pp. 10458-10464.

Kim J. et al. (2002), Proton conductivities and methanol permeabilities of membranes made from partially sulfonated polystyrene-block-poly(ethylene-ranbutylene)-block-polystyrene copolymers, Journal of Membrane Science, vol. 207, pp. 129-137.

Kobayashi T. et al. (1998), Proton-conducting polymers derived from poly(ether-etherketone) and poly(4-phenoxybenzoyl-1,4-phenylene), Solid State Ionics, vol. 106. No. 3-4, pp. 219-225.

Lam V.W.S. et al. (2008), High-Performance Osmium Nanoparticle Electrocatalyst for Direct Borohydride PEM Fuel Cell Anodes, Journal of The Electrochemical Society, vol. 155, No. 11, pp. B1155-B1160.

Lam V.W.S. et al. (2009), The effect of catalyst support on the performance of PtRu in direct borohydride fuel cell anodes, Journal of Applied Electrochemistry, vol. 39, No. 10, pp. 1763-1770.

Lam V.W.S. et al. (2012), Electrodeposited osmium three-dimensional anodes for direct borohydride fuel cells, Journal of Power Sources, vol. 212, pp. 57-65.

Lee W.-H. et al. (2015), Robust Hydroxide Ion Conducting Poly(biphenyl alkylene)s for Alkaline Fuel Cell Membranes, ACS Macro Letters, vol. 4, pp. 814-818.

Li Z.P. et al. (2005), Development of the direct borohydride fuel cell, Journal of Alloys and Compound, vol. 404-406, pp. 648-652.

Li Z.P. et al. (2006), Depression of hydrogen evolution during operation of a direct borohydride fuel cell, Journal of Power Sources, vol. 163, No. 1, pp. 555-559.

Li G.R. et al. (2015), Porous Carbon as Anode Catalyst Support to Improve Borohydride Utilization in a Direct Borohydride Fuel Cell, Fuel Cells, vol. 15, No. 2, pp. 270-277.

Linkous C.A. et al. (1998), Development of new proton exchange membrane electrolytes for water electrolysis at higher temperatures, International Journal of Hydrogen Energy, vol. 23, No. 7, pp. 525-529.

Liu B.H. et al. (2003), Anodic Oxidation of Alkali Borohydrides Catalyzed by Nickel Journal of The Electrochemical Society, vol. 150, No. 3, pp. A398-A402.

Liu B.H. et al. (2004), Electrocatalysts for the anodic oxidation of borohydrides, Electrochimica Acta, vol. 49, No. 19, pp. 3097-3105.

Liu B.H. et al. (2005), Performance improvement of a micro borohydride fuel cell operating at ambient conditions, Electrochimica Acta, vol. 50, No. 18, pp. 3719-3725.

Liu L. et al. (2016), Anion conducting multiblock copolymer membranes with partial fluorination and long head-group tethers, Journal of Materials Chemistry A, vol. 4, pp. 16233-16244.

Lopez-Haro M. et al. (2014), Three-dimensional analysis of Nafion layers in fuel cell electrodes, Nature Communications, vol. 5:5229, pp. 1-6.

Ma J. et al. (2010), A comprehensive review of direct borohydride fuel cells, Renewable and Sustainable Energy Reviews, vol. 14, No. 1, pp. 183-199.

Ma J. et al. (2010), Direct borohydride fuel cell using Ni-based composite anodes, Journal of Power Sources, vol. 195, No. 15, pp. 4709-4713.

Ma J. et al. (2012), Evaluation of multivalent phosphate cross-linked chitosan biopolymer membrane for direct borohydride fuel cells, Journal of Power Sources, vol. 202, pp. 18-27.

Ma J. et al. (2013), Effect of electrode fabrication method and substrate material on performance of alkaline fuel cells, Electrochemistry Communications, vol. 30, pp. 63-66.

Mai Z. et al. (2011), Polymer electrolyte based on chemically stable and highly conductive alkali-doped polyoxadiazole for direct borohydride fuel cell, Electrochemistry Communications, vol. 13, No. 9, pp. 1009-1012.

Marini S. et al. (2012), Advanced alkaline water electrolysis, Electrochimica Acta, vol. 82, pp. 384-391.

Milikić J. et al. (2016), Pd/c-PANI electrocatalysts for direct borohydride fuel cells, Electrochimica Acta, vol. 213, pp. 298-305.

Mohanty A.D. et al. (2015), Stable Elastomeric Anion Exchange Membranes Based on Quaternary Ammonium-Tethered Polystyrene-b-poly(ethylene-co-butylene)-b-polystyrene Triblock Copolymers, Macromolecules, vol. 48, No. 19, pp. 7085-7095.

(56) References Cited

OTHER PUBLICATIONS

Mukerjee S. et al. (1993), Enhanced electrocatalysis of oxygen reduction on platinum alloys in proton exchange membrane fuel cells, Journal of Electroanalytical Chemistry, vol. 357, No. 1, pp. 201-224.
Noshay A. et al. (1976), Sulfonated polysulfone, Journal of Applied Polymer Science, vol. 20, pp. 1885-1903.
Olsson J.S. et al. (2017), Poly(N,N-diallylazacycloalkane)s for Anion-Exchange Membranes Functionalized with N-Spirocyclic Quaternary Ammonium Cations, Macromolecules, vol. 50, pp. 2784-2793.
Olu P-Y. et al. (2015), Investigation of platinum and palladium as potential anodic catalysts for direct borohydride and ammonia borane fuel cells, Journal of Power Sources, vol. 297, pp. 492-503.
Olu P-Y. et al. (2016), Evaluation of anode (electro)catalytic materials for the direct borohydride fuel cell: Methods and benchmarks, Journal of Power Sources, vol. 327, pp. 235-257.
Park K.T. et al. (2006), Influence of anode diffusion layer properties on performance of direct borohydride fuel cell, Journal of Power Sources, vol. 162, No. 1, pp. 192-197.
Parrondo J. et al. (2014), Stability of Poly(2,6-dimethyl 1,4-phenylene)Oxide-Based Anion Exchange Membrane Separator and Solubilized Electrode Binder in Solid-State Alkaline Water Electrolyzers, Journal of the Electrochemical Society, vol. 161, No. 10, pp. F1015-F1020.
Parrondo J. et al. (2014), Degradation of anion exchange membranes used for hydrogen production by ultrapure water electrolysis, RSC Advances, vol. 4, No. 19, pp. 9875-9879.
Parrondo J. et al. (2014), Platinum supported on titanium-ruthenium oxide is a remarkably stable electrocatayst for hydrogen fuel cell vehicles, Proceedings of the National Academy of Sciences, vol. 111, No. 1, pp. 45-50.
Parrondo J. et al. (2015), Pyrochlore electrocatalysts for efficient alkaline water electrolysis, Journal of Materials Chemistry A, vol. 3, No. 20, pp. 10819-10828.
Parrondo J. et al. (2016), Reactive oxygen species accelerate degradation of anion exchange membranes based on polyphenylene oxide in alkaline environments, Physical Chemistry Chemical Physics, vol. 18, No. 29, pp. 19705-19712.
Qu C. et al. (2012), A high-performance anion exchange membrane based on bi-guanidinium bridged polysilsesquioxane for alkaline fuel cell application, Journal of Materials Chemistry, vol. 22, No. 17, pp. 8203-8820.
Raman R.K. et al. (2007), A Direct Borohydride/Hydrogen Peroxide Fuel Cell with Reduced Alkali Crossover, Fuel Cells, vol. 7, No. 3, pp. 225-231.
Sambandam S. et al. (2007), SPEEK/functionalized silica composite membranes for polymer electrolyte fuel cells, Journal of Power Sources, vol. 170, No. 2, pp. 259-267.
Ünlü M. et al. (2009), Hybrid Anion and Proton Exchange Membrane Fuel Cells, The Journal of Physical Chemistry C, vol. 113, No. 26, pp. 11416-11423.
Ünlü M. et al. (2010), Hybrid Polymer Electrolyte Fuel Cells: Alkaline Electrodes with Proton Conducting Membrane, Angewandte Chemie International Edition, vol. 49, No. 7, pp. 1299-1301.
Ünlü M. et al. (2010), Study of Alkaline Electrodes for Hybrid Polymer Electrolyte Fuel Cells, Journal of The Electrochemical Society, vol. 157, No. 10, pp. B1391-B1396.
Wang Z. et al. (2016), Alkaline Stability of Poly(Phenylene Oxide) Based Anion Exchange Membranes Containing Imidazolium Cations, Journal of The Electrochemcial Society, vol. 163, No. 8, pp. F824-F831.
Wang Z. et al. (2017), Anion Exchange Membranes Based on Polystyrene-Block-Poly(ethylene-ran-butylene)-Block-Polystyrene Triblock Copolymers: Cation Stability and Fuel Cell Performance, Journal of The Electrochemical Society, vol. 164, No. 12, pp. F1216-F1225.
Wang Z. et al. (2017), Polystyrene-Block-Poly(ethylene-ran-butylene)-Block-Polystyrene Triblock Copolymer Separators for a Vanadium-Cerium Redox Flow Battery, Journal of The Electrochemical Society, vol. 164, No. 4, pp. F372-F378.
Yang S. et al. (2006), Sulfonated poly(phenylene oxide) membranes as promising materials for new proton exchange membranes, Polymers for Advanced Technologies, vol. 17, pp. 360-365.
Yang X. et al. (2012), A direct borohydride fuel cell with a polymer fiber membrane and non-noble metal catalysts, Scientific Reports, vol. 2:567, pp.1-5.
Yang X. et al. (2014), The electrocatalytic application of $RuO_2$ in direct borohydride fuel cells, Materials Chemistry and Physics, vol. 145, No. 3, pp. 269-273.
Yun S. et al. (2014), Derivatized cardo-polyetherketone anion exchange membranes for all-vanadium redox flow batteries, Journal of Materials Chemistry A, vol. 2, pp. 6605-6615.
Zhiani M. et al. (2016), Performance study of passive and active direct borohydride fuel cell employing a commercial Pd decorated Ni—Co/C anode catalyst, Fuel, vol. 166, pp. 517-525.

\* cited by examiner

FIG. 4A  FIG. 4B  FIG. 4C
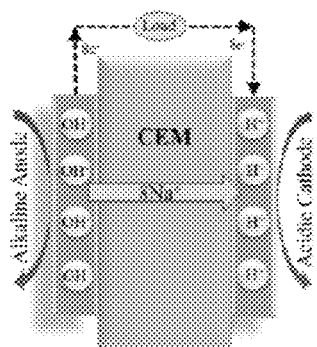
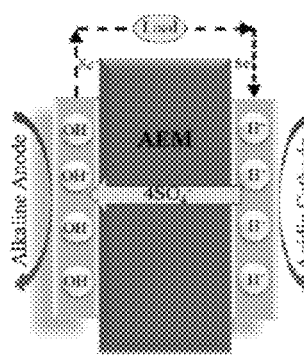
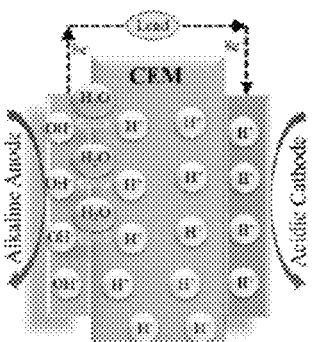
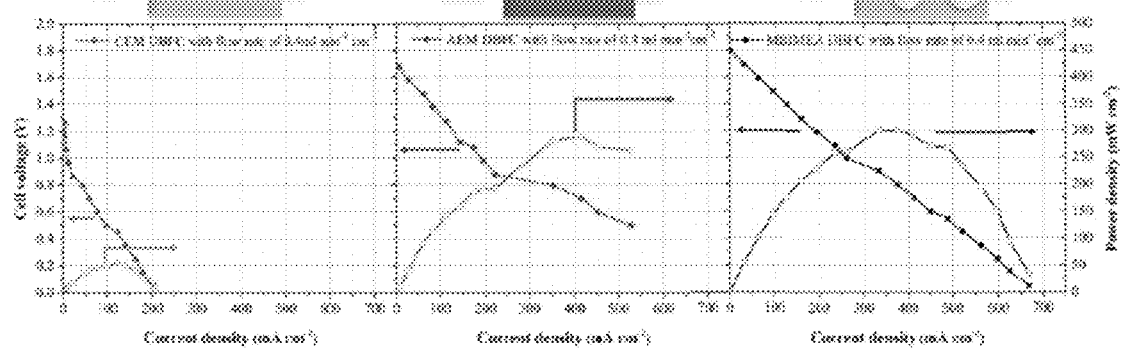

FIG. 10A
FIG. 10B
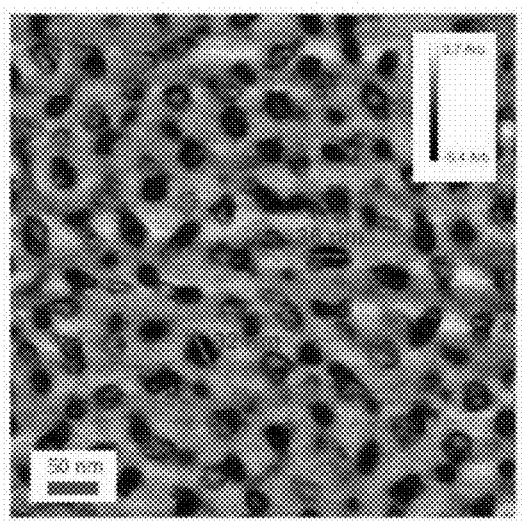
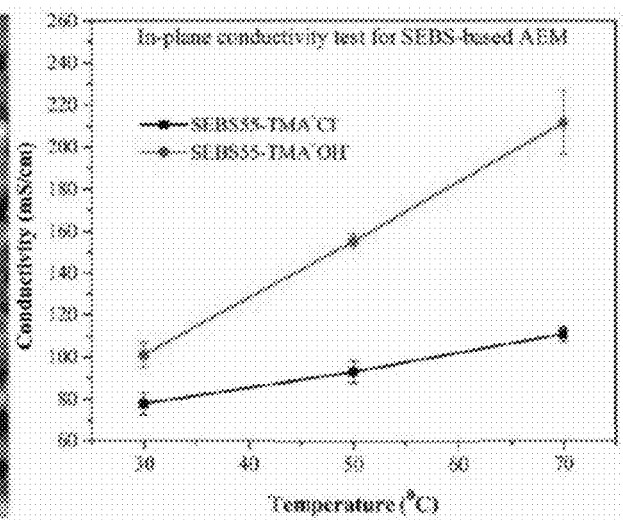

MICROSCALE-BIPOLAR-INTERFACE-ENABLED PH GRADIENTS IN ELECTROCHEMICAL DEVICES

CROSS-REFERENCE TO RELATED APPLICATIONS

This application claims priority from U.S. Provisional Application Ser. No. 62/654,870 filed on 9 Apr. 2018, which is incorporated herein by reference in its entirety.

STATEMENT REGARDING FEDERALLY SPONSORED RESEARCH OR DEVELOPMENT

This invention was made with government support under N00014-16-1-2833 awarded by the Office of Naval Research (ONR). The government has certain rights in the invention.

FIELD OF THE DISCLOSURE

The present disclosure is generally directed to the use of pH-gradient-enabled microscale-bipolar-interfaces in electrochemical energy conversion and storage devices, including, but not limited to direct borohydride fuel cells (DBFCs), polymer electrolyte fuel cells (PEFCs), polymer electrolyte electrolyzers (water as well as other compounds), and regenerative fuel cells (e.g., both unitized and non-unitized, using water as well as other possible working compounds) designed with an interfacial pH gradient that enables operation with decoupled pH between two electrodes, between an electrode and an electrolyte, or within an electrode.

BACKGROUND OF THE DISCLOSURE

Electrochemical energy conversion and storage devices usually operate at uniform pH or over a narrow pH range. For example, anion exchange membrane fuel cells (AEMFCs) and anion exchange membrane water electrolyzers (AEMWEs) both operate at high pH, while proton exchange membrane fuel cells (PEMFCs) and proton exchange membrane water electrolyzers (PEMWEs) both operate at low pH. The uniform pH environment of these devices frequently hampers the facility of one of the half-cell reactions. In PEMFCs/PEMWEs, where both the anode and cathode operate at acidic pH, the hydrogen oxidation/evolution reaction is quite facile while the oxygen reduction/evolution reaction is sluggish. In AEMFCs/AEMWEs, the converse is true. Moreover, the chemical stability of some reactants depends strongly on the pH. For example, sodium borohydride is only stable at high pH and disproportionates in acidic and neutral solutions. Hydrogen peroxide, conversely, disproportionates at high pH but is stable at low pH. Therefore, a direct borohydride fuel cell using hydrogen peroxide as oxidant can only be operated effectively by maintaining different pH at the anode and cathode. Thus, if electrochemical devices can be designed with an interfacial pH gradient that enables decoupled pH at the two electrodes, it is possible to: a) enhance half-cell reaction kinetics; b) significantly expand the selection of electrocatalysts (especially non-noble-metal electrocatalysts) that can be used, and c) broaden the selection of (combinations of) fuels and oxidants that can be employed.

Hybrid AEM/CEM bipolar configurations for $H_2/O_2$ fuel cells and direct methanol fuel cells (DMFCs) have been previously demonstrated. The $H_2/O_2$ fuel cell with an AEM/cation exchange membrane (CEM) bipolar configuration yielded a current density of a few tens of $mA/cm^2$, which was low compared to state-of-the-art PEMFCs and AEMFCs. The lower performance was attributed to non-optimized fabrication methods for the bipolar electrode assembly and to the large membrane thickness (174 μm). To improve performance, a modified bipolar interface was employed, wherein the AEM component was integrated within a high-pH anion conducting electrode, which was directly coupled to a Nafion® membrane. By using this modified bipolar interface, the ionic resistance contribution of the AEM was avoided and the bipolar junction resided closer to the electrode, allowing for higher transport rates. This device yielded enhanced performance with a peak power density of 62 $mW/cm^2$ in $H_2/O_2$ mode, though this was still significantly lower than a state-of-the-art PEMFC. Devices prepared with this modified design provided a key advantage compared with traditional PEMFCs, namely self-humidification by water generated at the bipolar interface that enabled operation under dry conditions. The concept of the bipolar interface described above offers interesting possibilities if the overall performance of the device employing the interface can be improved. The present disclosure provides for such an improved performance.

Direct borohydride fuel cells (DBFCs) have received considerable attention due to their high power density, high open circuit and operating voltages, and avoidance of CO poisoning of the catalysts. The high energy density of sodium borohydride (9.3 kWh $kg^{-1}$) and specific capacity of 5.67 kAh $kg^{-1}$ offer considerable advantages over competing technologies. Liquid $H_2O_2$ is a safe and energy dense oxidant for low temperature DBFCs. The standard thermodynamic cell voltage of a direct sodium borohydride fuel cell is 2.20 V when liquid $H_2O_2$ is employed as oxidant, a significant enhancement over the 1.23 V obtained with a traditional $H_2O_2$ cell.

The half-cell and overall reactions of a DBFC, relative to a standard hydrogen electrode (SHE), are:

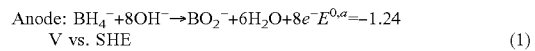

$$\text{Anode: } BH_4^- + 8OH^- \rightarrow BO_2^- + 6H_2O + 8e^- \quad E^{0,a} = -1.24 \text{ V vs. SHE} \tag{1}$$

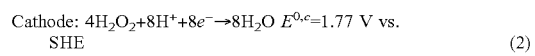

$$\text{Cathode: } 4H_2O_2 + 8H^+ + 8e^- \rightarrow 8H_2O \quad E^{0,c} = 1.77 \text{ V vs. SHE} \tag{2}$$

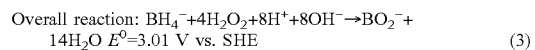

$$\text{Overall reaction: } BH_4^- + 4H_2O_2 + 8H^+ + 8OH^- \rightarrow BO_2^- + 14H_2O \quad E^0 = 3.01 \text{ V vs. SHE} \tag{3}$$

$$\text{Junction potential correction: 3 M KOH} \| \text{1.5 M } H_2SO_4 \quad E_j = 0.81 \text{ V} \tag{4}$$

$$\text{Net cell voltage: } E^0 - E_j = 2.20 \text{ V} \tag{5}$$

DBFCs have been primarily demonstrated using either a CEM or an AEM separator. Poly(phenylene oxide)-based AEMs (PPO-TMA$^+$) have been previously synthesized and employed for the fabrication of a bipolar interface membrane electrode assembly (BIMEA) for a DBFC operated with liquid $H_2O_2$. The BIMEA configuration included an alkaline anode containing solubilized PPO-TMA+ anion exchange ionomer (AEI) as the binder, an acidic Nafion® membrane, and an acidic cathode containing solubilized Nafion® as the binder. Two additional configurations were also evaluated: 1) DBFC with an all-AEM configuration that included an alkaline anode with solubilized PPO-TMA$^+$ AEI binder, AEM (PPO-TMA$^+$) separator and an alkaline cathode with solubilized PPO-TMA$^+$ AB binder; 2) DBFC with an all-CEM configuration that comprised an acid anode with a solubilized Nafion® binder, a Nafion® membrane and an acid cathode with solubilized Nafion® binder. Under the same experimental conditions, peak power densities of 110 mW/cm², 82 mW/cm² and 80 mW/cm² were obtained for the DBFC with the BIMEA, AEM and CEM configurations respectively. While these results were promising, further studies were deemed necessary to understand the functional principles of the BIMEA interface, specifically the role of the pH gradient across the interface, and to achieve the power densities required for practical applications.

Electrocatalysts such as Ni, Pt, and Pd have good catalytic activity towards both the electrochemical oxidation and the chemical hydrolysis of $NaBH_4$. DBFCs with Ni, Pt or Pd at the anode yield high power densities, but have low faradic efficiencies, e.g., 50% for nickel and 75% for palladium. It has been observed that among all the metal catalysts, Au is the most effective and Ni is the least effective electrocatalyst for the borohydride oxidation reaction (in terms of the number of electrons being transferred, not in terms of power density). It has also been observed that the electrooxidation of borohydride yields 7-8 electrons on gold and silver disk electrodes, and only 4 electrons on platinum disk electrodes. The relatively higher utilization efficiency of gold and silver electrodes towards electrooxidation of borohydride are primarily due to their low activity for the hydrolysis of borohydride. However, gold and silver exhibit sluggish kinetics towards the borohydride oxidation reaction (BOR). For practical applications, it is more desirable to have large current and power densities for the BOR Pd catalyst loaded on nickel foam has been employed at the anode to achieve high DBFC performance (a peak power density of 250 mW/cm²). It has been pointed out that nickel foam has a positive contribution to achieve high open circuit voltage (OCV) in a DBFC. For the reduction of hydrogen peroxide, the use of Pt as the cathode catalyst has yielded good performance (a peak power density of 325 mW/cm²) in a DBFC. In the present disclosure, and based on the above considerations, Pd deposited on Ni foam was selected as the anode catalyst for the BOR. Pt/C was selected as the cathode catalyst for the hydrogen peroxide reduction reaction.

SUMMARY OF THE INVENTION

Among the various aspects of the present disclosure is the provision of compositions for use in and methods of inducing or providing a pH gradient in electrochemical or chemical systems. Briefly, the pH gradient is induced by use of coated particles or films with an ion exchange ionomer.

An aspect of the present disclosure provides for a method of inducing or providing a pH gradient in an electrochemical or a chemical system comprising: coating a catalytic or non-catalytic particle, a plurality of catalytic or non-catalytic particles, or a catalytic or non-catalytic film with an ion exchange ionomer, resulting in an ionomer coated catalytic or non-catalytic particle, an ionomer coated plurality of catalytic or non-catalytic particles, or an ionomer coated catalytic or non-catalytic film; and placing the coated catalytic or non-catalytic particle, the coated plurality of catalytic or non-catalytic particles, or the coated catalytic or non-catalytic film in contact with an ion exchange membrane or another particle or plurality of particles.

In some embodiments, the ion exchange ionomer is selected from anion exchange ionomer or a cation exchange ionomer.

In some embodiments, the ion exchange membrane is selected from a cation exchange membrane or an anion exchange membrane.

In some embodiments, the catalytic or non-catalytic particle, catalytic or non-catalytic plurality of particles, or the catalytic or non-catalytic film comprises a material selected from one or more of the group consisting of Ni, Pt, Pd, Ir, Au, Ag, CoO, a noble metal, a metal alloy thereof, a metal mixture thereof, and combinations thereof.

In some embodiments, the cation exchange membrane or cation exchange ionomer comprises a material selected from one or more of the group consisting of Nafion® 212, Nafion® 115, Nafion® 117, sulfonated polystyrene-block-poly(ethylene-ran-butylene)-block-polystyrenetri-block copolymer, sulfonated poly(phenylene oxide), BAM (Ballard), poly(ethylene-co-tetrafluoroethylene)-graft-poly(styrene sulfonic acid), poly(vinylidene fluoride)-graft-poly(styrene sulfonic acid), sulfonated poly(arylene ether ketone), sulfonated poly(4-phenoxybenzoyl-1,4-phenylene), and sulfonated polysulfone.

In some embodiments, the anion exchange membrane or anion exchange ionomer comprises a material selected from one or more of the group consisting of polystyrene-block-poly(ethylene-ran-butylene)-block-polystyrene tri-block copolymer-based backbone, poly (phenylene oxide)-based backbone, polysulfone-based backbone, poly(N,N-diallylazacycloalkane)-based backbone, bromoalkyl-tethered poly (biphenyl alkylene)-based backbone, multiblock copoly (arylene ether)-based backbone, poly (vinylbenzyl chloride)-based backbone, and cardo-polyetherketone-based backbone. For example, in some embodiments, the method comprises a functional group selected from one or more of the group consisting of benzyl-trimethylammonium, benzyl-imidazolium, guanidium, benzyl-tris (2, 4, 6-trimethoxyphenyl) phosphonium, permethyl cobaltocenium, 1,4-dimethylpiperazinium, and benzyl-trimethylphosphonium.

In some embodiments, the method comprises introducing either a reducing agent or an oxidizing agent to a first electrode comprising a first catalyst and that is coated by an ion exchange ionomer.

In some embodiments, the method comprises introducing either an oxidizing agent or a reducing agent to a second electrode comprising a second catalyst and that is coated by an ion exchange ionomer.

In some embodiments, the first electrode and the second electrode are separated by an ion exchange membrane.

In some embodiments, a reaction with a reduced or oxidized species from the first electrode and an oxidized or reduced species from the second electrode occurs at an interface between the ion exchange ionomer coating and the ion exchange membrane, wherein the reaction results in splitting water, forming water, forming a compound produced by a half-cell reaction occurring at the first electrode and the second electrode, or forming a compound produced by an overall full cell reaction.

In some embodiments, the reducing agent comprises a material selected from one or more of the group consisting of: sodium borohydride, methanol, hydrazine, hydrogen, water, and ethanol.

In some embodiments, the oxidizing agent comprises a material selected from one or more of the group consisting of hydrogen peroxide, water, and oxygen.

In some embodiments, the reducing agent or the oxidizing agent is fed contacted with the first electrode or the second electrode in a single-pass mode or in a recycle mode.

In some embodiments, the ion exchange ionomer coating is of a thickness and coverage sufficient to increase the pH gradient across the interface compared to the pH gradient without the ionomer coating; to provide a pH gradient of about 1 pH unit per nm of the interface; or prevent catholyte contact with an anode active site.

Another aspect of the present disclosure provides for a method of electrochemical conversion from combining a reducing agent and an oxidizing agent, comprising: introducing either a reducing agent or an oxidizing agent to a first electrode comprising a first catalyst coated by a first ion exchange ionomer; or introducing either an oxidizing agent or a reducing agent to a second electrode comprising a second catalyst coated by a second ion exchange ionomer.

In some embodiments, the first ion exchange ionomer and second an ion exchange ionomer are independently selected from an anion exchange ionomer or a cation exchange ionomer.

In some embodiments, the first electrode and the second electrode are separated by an ion exchange membrane.

In some embodiments, a reaction with a reduced or oxidized species from the first electrode and an oxidized or reduced species from the second electrode occurs at an interface between the ion exchange ionomer coating and the ion exchange membrane, wherein the reaction results in splitting water, forming water, forming a compound produced by a half-cell reaction occurring at the first electrode and the second electrode, or forming a compound produced by an overall full cell reaction.

In some embodiments, the ion exchange membrane is a cation membrane or an anion exchange membrane.

In some embodiments, the first catalyst is a metallic or a non-metallic particle or a metallic or a non-metallic film comprising a material selected from the group consisting of Ni, Pt, Pd, Ir, Au, Ag, CoO, a noble metal, a metal alloy thereof, a metal mixture thereof, and a combination thereof.

In some embodiments, the second catalyst is a metallic or a non-metallic particle or a metallic or a non-metallic film comprising a material selected from the group consisting of Ni, Pt, Pd, Ir, Au, Ag, CoO, a noble metal, a metal alloy thereof, a metal mixture thereof, and a combination thereof.

In some embodiments, the cation exchange membrane or cation exchange ionomer comprises a material selected from one or more of the group consisting of Nafion®212, Nafion® 115, Nafion® 117, sulfonated polystyrene-block-poly(ethylene-ran-butylene)-block-polystyrenetri-block copolymer, sulfonated poly (phenylene oxide), BAM (Ballard), poly(ethylene-co-tetrafluoroethylene)-graft-poly(styrene sulfonic acid), poly(vinylidene fluoride)-graft-poly(styrene sulfonic acid), sulfonated poly(arylene ether ether ketone), sulfonated poly(4-phenoxybenzoyl-1,4-phenylene), and sulfonated polysulfone.

In some embodiments, the anion exchange membrane or anion exchange ionomer comprises a material selected from one or more of the group consisting of a polystyrene-block-poly(ethylene-ran-butylene)-block-polystyrene tri-block copolymer-based backbone, poly (phenylene oxide)-based backbone, polysulfone-based backbone, poly(N,N-diallylazacycloalkane)-based backbone, bromoalkyl-tethered poly (biphenyl alkylene)-based backbone, multiblock copoly (arylene ether)-based backbone, poly (vinylbenzyl chloride)-based backbone, and cardo-polyetherketone-based backbone.

In some embodiments, the backbone comprises a functional group selected from one or more of the group consisting of benzyl-trimethylammonium, benzyl-imidazolium, guanidium, benzyl-tris (2, 4, 6-trimethoxyphenyl) phosphonium, permethyl cobaltocenium, 1,4-dimethylpiperazinium, and benzyl-trimethylphosphonium.

In some embodiments, the cation exchange ionomer comprises a material selected from one or more of the group consisting of sulfonated polystyrene-block-poly(ethylene-ran-butylene)-block-polystyrenetri tri-block copolymer, perfluorinated Nafion® solution, sulfonated poly (phenylene oxide), sulfonated polysulfone, sulfonated poly (arylene ether ether ketone), and sulfonated poly(4-phenoxybenzoyl-1,4-phenylene).

In some embodiments, the reducing agent comprises a material selected from one or more of the group consisting of: sodium borohydride, methanol, hydrazine, hydrogen, water, and ethanol.

In some embodiments, the oxidizing agent comprises a material selected from one or more of the group consisting of hydrogen peroxide, water, and oxygen.

In some embodiments, the reducing agent or the oxidizing agent is fed contacted with the electrodes in a single-pass mode or in a recycle mode.

In some embodiments, the ion exchange ionomer coating is of a thickness and coverage sufficient to increase a pH gradient across the interface compared to a pH gradient without the ionomer coating; to provide a pH gradient of about 1 pH unit per nm of the interface; or prevent catholyte contact with an anode active site.

DESCRIPTION OF THE DRAWINGS

FIG. 4A-4C depict the polarization curves obtained from DBFC experiments together with the configuration schemes employed. (A) is a polarization curve for a DBFC with an all-CEM configuration that included an acid anode, CEM separator and an acid cathode. (B) is a polarization curve for a DBFC with an all-AEM configuration that included an alkaline anode, AEM separator and an alkaline cathode. (C) is a polarization curve for a DBFC with a pH-gradient-enabled microscale bipolar interface configuration that included an alkaline anode, CEM separator and an acid cathode.

FIG. 10A-10B depict (A) phase separation morphology of tri-block copolymer (SEBS55-TMA) and (B) the hydroxide and chloride ions conductivity for SEBS55-TMA.

DETAILED DESCRIPTION

Figure 1:
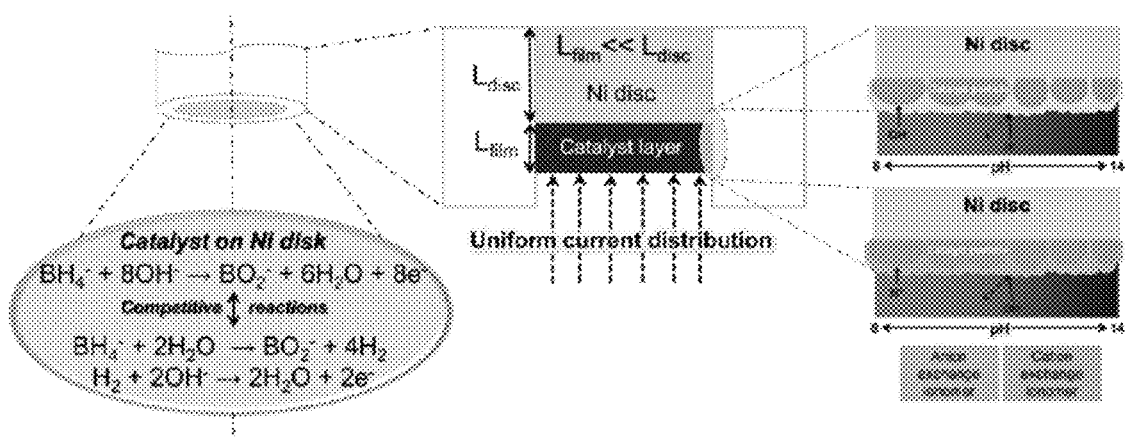
FIG. 1 depicts a scheme for the recessed planar electrode system designed to simulate a pH-gradient-enabled microscale bipolar junction with the pH sensitive sodium borohydride electrooxidation reaction as a test case.

The present application is directed to preparing microscale bipolar interfaces and examining their ability to control a local pH gradient at the electrocatalytic reaction sites and to translate these microscale bipolar interfaces to DBFCs or any other electrochemical energy conversion or storage devices.

The theoretical OCV for DBFC operated with $H_2O_2$ is 2.2 V. The low OCV observed in DBFCs is primarily because of the crossover of alkaline fuel and acidic oxidant steams. A highly alkaline pH is imperative for the DBFC to achieve the high OCV values reported herein as the BOR ($E^0$=−1.24 V vs. SHE) is in competition with the hydrogen oxidation reaction ($E^0$=0 V vs. SHE). Thus, the measured and reported OCV was understood to be a mixed potential with contributions from both reactions with a strong dependence on pH.

As described herein, separators were shown to be useful in devices or fuel cells such as direct borohydride fuel cells (DBFCs), hydrogen fuel cell, oxygen fuel cells electrolyzer, or unitized regenerative fuel cells (URFCs). By enabling a high pH gradient, the separators allowed the different halves of the cell to operate in an optimized pH zone. A high pH gradient can reduce the rate of competing electrochemical processes (e.g., enhancing operating voltage) or enabling a system to reasonably work (e.g., the DBFC requires different pH for the half cells because sodium borohydride is only stable at high pH and hydrogen peroxide, conversely, is stable at low pH).

As an example, DBFCs are irreversible, unlike other systems. An advantage of a DBFC, compared to other systems, is the production of no gas evolution on discharge (simplified reaction: $NaBH_4 + 2O_2 \rightarrow NaBO_2 + 2H_2O + Electricity$) and high power density. As such, DBFCs can be useful for underwater submersibles.

Described herein is a new device architecture (e.g., a microscale-bipolar interface) for use in systems that benefit from the presence of a well-defined pH gradient. Presently disclosed is the application of the unique architecture in a direct borohydride fuel cell.

An example of a bipolar-interface-enabled pH gradient can comprise a polystyrene-block-poly(ethyleneran-butylene)-block-polystyrene triblock copolymer-based anion exchange ionomer as the anode binder, a Nafion® membrane as separator, and Nafion® ionomer as the cathode binder. Using this combination, the inventors were able to show compelling power density at a more useful voltage than conventional approaches (see e.g., FIG. 5).

As described herein, a microscale-bipolar interface has been demonstrated to be capable of maintaining large pH gradients between acidic and alkaline phases in ex-situ tests as detailed in the Examples. Further, such interfaces were shown to be used in a direct borohydride fuel cell. A high voltage sodium borohydride device was obtained with an open circuit voltage of 1.95 V. The direct sodium borohydride fuel cell yielded a promising current density of 330 mA/cm$^2$ at 1.5 V and a peak power density of 630 mW/cm$^2$ at 1 V. The high performance of the sodium borohydride fuel cell can be useful in transportation, such as in a fuel cell automobile, autonomous vehicles such as UAVs and UUVs, or a stationary power generator.

The present disclosure can be useful in any field involving electrochemical energy generation. This device can be incorporated into any system that requires (or can be optimized with) the separation of phases with different pH values.

Compared with conventional proton exchange membrane fuel cell, which is operated at 0.7 V, the direct sodium borohydride fuel cell with pH-gradient-enabled microscale bipolar interface configuration enabled the operation of a fuel cell automobile at 1.4 V with similar current density. This direct borohydride fuel cell with bipolar interface provided a pathway to use a dense and readily transportable fuel circumventing the Carnot limit on efficiency. The high-voltage operation without compromise on power density can help reduce costs of fuel cell stacks by simplifying stack design considerably. Doubling the cell voltage can reduce the number of cells by a factor of 2 without compromising overall power output (current scales with cell area, where there is much flexibility), while still enabling seamless integration with motors and other accessories at the rated stack voltage.

A catalyst can be selected from any one of the catalysts known in the art, used in the compositions and methods as described herein, sufficient to provide a pH gradient. For example, the catalyst can comprise Ni, Pt, Pd, Ir, Au, Ag, CoO, noble metal, and similar elements, or combinations thereof (e.g., metal alloys and metal mixtures). As another example, the catalyst can be supported by carbon.

As described herein, an ionomer can have a thickness on the scale of nanometers. For example, the ionomer can have a thickness of about 1 nm; about 2 nm; about 3 nm; about 4 nm; about 5 nm; about 6 nm; about 7 nm; about 8 nm; about 9 nm; about 10 nm; about 11 nm; about 12 nm; about 13 nm; about 14 nm; about 15 nm; about 16 nm; about 17 nm; about 18 nm; about 19 nm; about 20 nm; about 21 nm; about 22 nm; about 23 nm; about 24 nm; about 25 nm; about 26 nm; about 27 nm; about 28 nm; about 29 nm; about 30 nm; about 31 nm; about 32 nm; about 33 nm; about 34 nm; about 35 nm; about 36 nm; about 37 nm; about 38 nm; about 39 nm; about 40 nm; about 41 nm; about 42 nm; about 43 nm; about 44 nm; about 45 nm; about 46 nm; about 47 nm; about 48 nm; about 49 nm; about 50 nm; about 51 nm; about 52 nm; about 53 nm; about 54 nm; about 55 nm; about 56 nm; about 57 nm; about 58 nm; about 59 nm; about 60 nm; about 61 nm; about 62 nm; about 63 nm; about 64 nm; about 65 nm; about 66 nm; about 67 nm; about 68 nm; about 69 nm; about 70 nm; about 71 nm; about 72 nm; about 73 nm; about 74 nm; about 75 nm; about 76 nm; about 77 nm; about 78 nm; about 79 nm; about 80 nm; about 81 nm; about 82 nm; about 83 nm; about 84 nm; about 85 nm; about 86 nm; about 87 nm; about 88 nm; about 89 nm; about 90 nm; about 91 nm; about 92 nm; about 93 nm; about 94 nm; about 95 nm; about 96 nm; about 97 nm; about 98 nm; about 99 nm; or about 100 nm. Recitation of each of these discrete values is understood to include ranges between each value.

As described herein, a catalyst layer or particle can have a thickness on the micron level. For example, the catalyst layer or particle can have a thickness of about 1 μm; about 2 μm; about 3 μm; about 4 μm; about 5 μm; about 6 μm; about 7 μm; about 8 μm; about 9 μm; about 10 μm; about 11 μm; about 12 μm; about 13 μm; about 14 μm; about 15 μm; about 16 μm; about 17 μm; about 18 μm; about 19 μm; about 20 μm; about 21 μm; about 22 μm; about 23 μm; about 24 μm; about 25 μm; about 26 nm; about 27 μm; about 28 μm; about 29 μm; about 30 μm; about 31 μm; about 32 μm; about 33 μm; about 34 μm; about 35 μm; about 36 μm; about 37 μm; about 38 μm; about 39 μm; about 40 μm; about 41 μm; about 42 μm; about 43 μm; about 44 μm; about 45 μm; about 46 μm; about 47 μm; about 48 nm; about 49 μm; about 50 μm; about 51 μm; about 52 μm; about 53 μm; about 54 μm;

about 55 µm; about 56 µm; about 57 µm; about 58 µm; about 59 µm; about 60 µm; about 61 µm; about 62 µm; about 63 µm; about 64 µm; about 65 µm; about 66 µm; about 67 µm; about 68 µm; about 69 µm; about 70 nm; about 71 µm; about 72 µm; about 73 µm; about 74 µm; about 75 µm; about 76 µm; about 77 µm; about 78 µm; about 79 µm; about 80 µm; about 81 µm; about 82 µm; about 83 µm; about 84 µm; about 85 µm; about 86 µm; about 87 µm; about 88 µm; about 89 µm; about 90 µm; about 91 µm; about 92 µm; about 93 µm; about 94 µm; about 95 µm; about 96 µm; about 97 µm; about 98 µm; about 99 µm; or about 100 µm. Recitation of each of these discrete values is understood to include ranges between each value.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Microscale-Bipolar-Interface-Enabled pH Gradients in Electrochemical Devices The efficacy of the microscale bipolar interface in maintaining a pH gradient was established using recessed planar electrodes (RPEs). The RPEs were designed to mimic the electrochemical environment and current distribution of the anode half-cell. The OCV was measured at different bulk pH values and it was observed that the predominant reaction at the anode was unchanged with changing bulk pH when the microscale bipolar interface was employed. This provided the first direct evidence of the effectiveness of the microscale bipolar interface configuration in maintaining a high pH gradient across the bipolar junction and in preventing catholyte contact with the anode active sites. Subsequently, DBFC devices with the pH-gradient-enabled microscale bipolar interface (PMBI) configuration were scaled to a 25-cm$^2$ active cell area to yield the highest DBFC performance reported thus far.

FIG. 1 depicts a scheme for the recessed planar electrode system designed to simulate a pH-gradient-enabled microscale bipolar junction with the pH sensitive sodium borohydride electro oxidation reaction as a test case. The PMBI configuration was selected to control the local pH at the anode electrocatalyst. The PMBI configuration allows the realization of the key idea that a cation exchange separator in intimate contact with an anion exchange binder covered electrocatalyst would behave as a microscopic and localized bipolar interface. The effect of the electrode binder composition was examined using the RPE depicted in FIG. 1.

The RPE system was designed to simulate the conditions at the anode electrodes used in the DBFC. The recessed nature of the disk ensured that the current distribution was uniform over the disk surface and the PTFE shroud ensured that slurry did not stick to the shroud walls leading to undesirable edge thickening. Thus, a uniform, planar catalyst layer with current distribution isogalvanic lines orthogonal to the surface over the entire active area was ensured.

The discs were precision machined out of a Ni rod (Goodfellow, 5 mm dia., 99.99+% purity) to simulate the Ni support used in the DBFC and fitted into a PTFE U-Cup (Pine Instruments) as depicted in FIG. 1. The Ni disk was covered by a thin catalyst film using standard drop casting techniques using catalyst inks that matched the compositions used in the DBFC anode.

The first catalyst ink, used at the anode, was made of a suspension of Pd/C (40 wt % Pd/C from Premetek Corporation, P30A400) catalyst in a solution of chloromethylated polystyrene-block-poly(ethylene-ran-butylene)-block-polystyrene (CMSEBS55; 55:45 molar ratio of styrene to rubber) in chlorobenzene.

Figure 9:
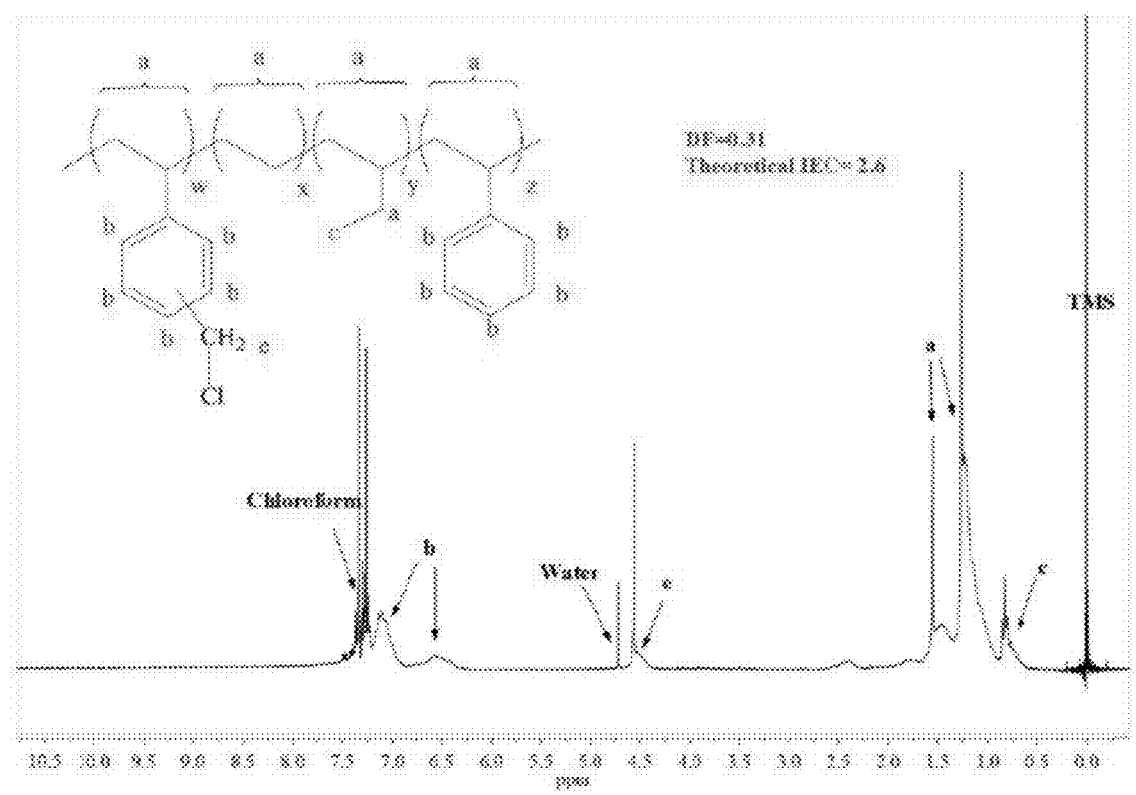
FIG. 9 depicts the $^1$H NMR of CMSEBS55.

The choloromethylated polystyrene-block-poly(ethylene-ran-butylene)-block-polystyrene (CMSEBS) was synthesized by dissolving 5 g of styrene-(ethylene-butylene)-styrene (SEBS) in chlorobenzene (250 ml). Paraformadehyde (16.7 g) was added into the mixture and the temperature was set to 55° C. Chlorotrimethylsilane (70.5 ml) and tin (IV) chloride (1.3 ml) were added to mixture, and the reaction temperature was raised to 80° C. The mixture was reacted for with 7 days. The product was precipitated in methanol (1.3 L), recovered by filtration, and washed with abundant methanol. The product was purified by re-dissolving in chloroform/chlorobenzene (4:1) and re-precipitating in methanol. The purification process was repeated two times. Chloromethylation of SEBS (55:45 molar ratio of styrene to rubber) resulted in chloromethylated SEBS polymers CMSEBS55 with degrees of chloromethylation (DF; mol of chloromethyl groups per mol of polymer repeat unit) of 0.31, as shown in FIG. 9.

A suspension of 0.4 g Pd/C catalyst in a solution of 0.17 g CMSEBS55 in 9.75 ml of chlorobenzene was sonicated for 7 minutes. The resultant ink was sprayed on a porous nickel foam electrode (1.6 mm thickness from MTI Corporation) with an airbrush (Badger model 150). The electrode was immersed into a mixed solution of NMP (30 ml) and TMA solution (3 ml) at 30° C. for two days to functionalize the CMSEBS55 and yield the AEI (SEBS55-TMA).

The second catalyst ink, used at the cathode, was made of a suspension of 0.4 g PVC catalyst (46 wt % Pt/C from Tanaka K. K.) in a solution of 3.42 g Nafion® perfluorinated resin solution in 6 ml of isopropanol/water mixture (1:1 weight ratio), and sonicated for 7 minutes. The resultant ink was sprayed on a porous carbon paper (GDL 24AA diffusion media from Ion Power) with an airbrush (Badger model 150).

The nominal catalyst loadings at the anode and the cathode for the 5-cm$^2$ active area cell was 1 mg$_{catalyst}$/cm$^2$. The nominal catalyst loadings at the anode and the cathode for the 25-cm$^2$ active area cell was 3 mg$_{catalyst}$/cm$^2$. The Pd/C deposited on Ni foam electrode and PVC deposited on the GDL 24AA electrode were characterized using a SEM (FEI Nova 230) equipped with an EDX analyzer. The beam energy used was 10 kV, the chamber pressure was 9×10$^{-3}$ Pa and the chamber temperature was 23° C.

The electrolyte bulk consisted of a NaBH$_4$ solution in KOH. The solution composition was varied to change the pH value in the bulk and the OCV was monitored over time. The following solution compositions used to test the OCV: 1) 0.5 M KOH+0.1 M NaBH$_4$; 2) 0.1 M KOH+0.1 M NaBH$_4$; 3) 0.01 M KOH+0.1 M NaBH$_4$; 4) DI water+0.1 M NaBH$_4$; 5) 0.05 M H$_2$SO$_4$+0.1 M NaBH$_4$. By changing the bulk electrolyte pH values in the RPE system, the control of the pH gradient across the binder in the thin-film electrode could be observed by monitoring OCV of BOR All the measurements were carried out in a standard three electrode system with a Pt counter electrode and a calomel reference electrode. The pH was recorded using an Accumet® portable laboratory pH meter prior to the start of OCV monitoring.

Figure 2:
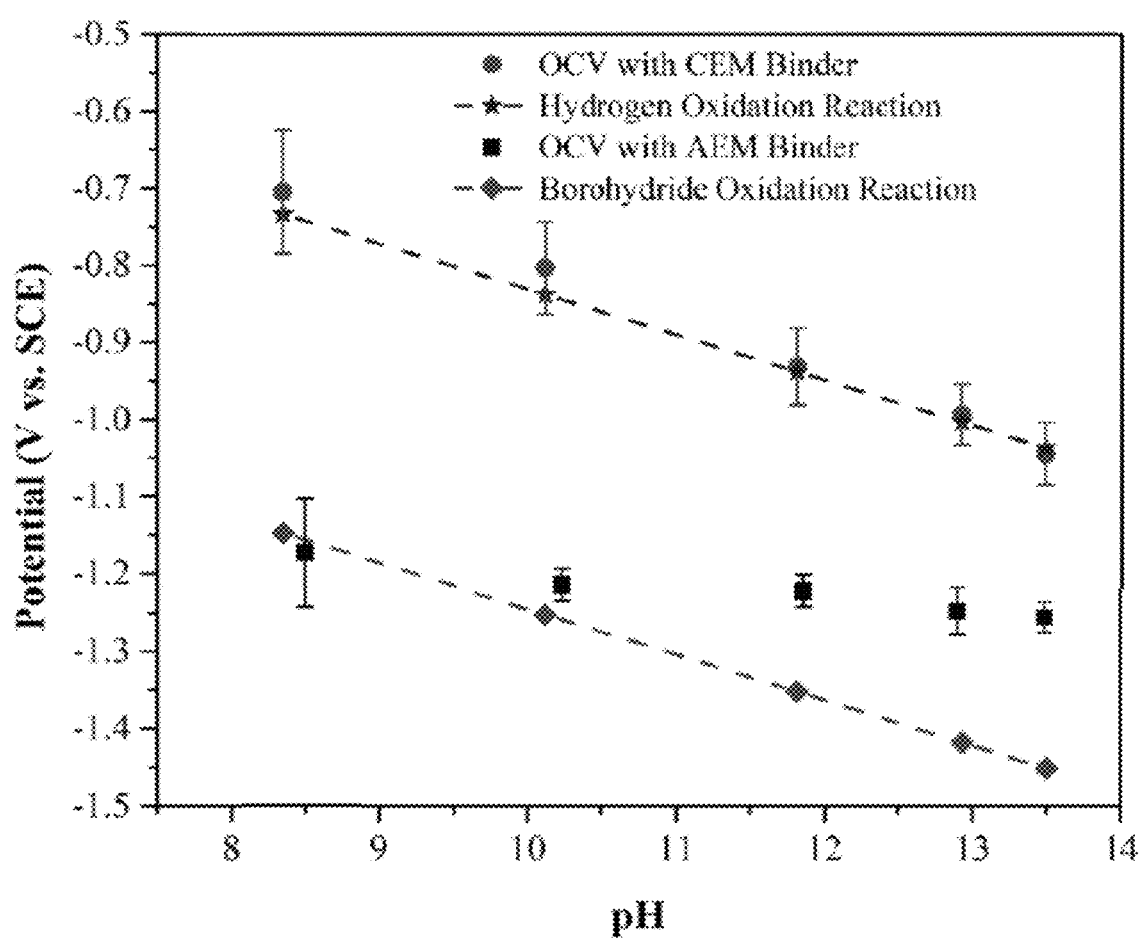
FIG. 2 depicts the hydrogen oxidation reaction (HOR) and the borohydride oxidation reaction (BOR) OCVs.

FIG. 2 depicts the hydrogen oxidation reaction (HOR) and the borohydride oxidation reaction (BOR) OCVs. Initially, the highly basic anolyte strongly favored the BOR. Over time, the use of a CEM such as Nafion® as the separator would lead to a drop in the bulk anolyte pH and the OCV measured would be a function of the ratio of protons to borohydride ions available at the electrocatalyst surface. The electrocatalysts were reasonably assumed to be covered by a thin layer of the binder and hence the local conditions at the electrocatalyst surface would be a function of the binder. In case of a CEM binder being used, it has been previously shown that in sufficiently alkaline conditions in the bulk electrolyte, the kinetics of the hydrogen evolution reaction/hydrogen oxidation reaction (HER/HOR) is independent of the nature of the binder due to sufficient OR ions being transported through the CEM. The HOR and the BOR OCVs depicted in FIG. 2 were calculated for different pH values from the standard equilibrium potentials using Eqn. 1 applicable to the reversible hydrogen electrode:

$$E^0 = (-1.24 - 0.059 \times pH) \text{V vs. SCE} \quad (1)$$

BOR theoretical OCV can be obtained by Eqn. 2:

$$E^{BO} = (-1.24 + 0.059 \times pH - 0.241) \text{ V vs. SCE} \quad (2)$$

These OCVs serve as upper and lower bounds respectively for the experimental measurements with different binder configurations and at different pH values. The OCV values obtained herein with the RPE with the CEM based thin-film electrode, depicted in FIG. 2, was found to closely track the theoretical OCV for the HOR. The measured OCVs for the case of the electrode with the CEM binder showed that the contribution from the BOR to the OCV was minimal and that the anode was behaving similar to the anode in a standard hydrogen fuel cell.

The OCV values measured on the RPE with the AEM binder was found to be dominated by the contribution from the BOR. At a pH of 13.5, the OCV was a mixed potential with a >60% contribution from the BOR Interestingly, an inverse correlation was observed between the electrolyte bulk pH and the apparent contribution of the BOR to the mixed potential. This result would be anomalous if the pH at the reaction site was expected to track the pH changes in the bulk as the BOR reaction would be expected to contribute more to the mixed potential at higher pH due to the higher OH⁻ concentration driving it forward. The remarkably constant OCV values over a wide range of alkaline pH values unequivocally confirmed that the reaction was not occurring in an environment similar to the electrolyte bulk. The AEI used in this study has been previously reported to show remarkable selectivity for anions. Thus, despite the lowered alkalinity in the electrolyte bulk, the binder selectivity ensured that local concentration of the OH⁻ ion at the reaction site was minimally affected by changes in the bulk pH. This high pH gradient across the AEI covering the surface of electrocatalyst ensured that the BOR contribution to the mixed potential was the same across the entire bulk pH range under consideration. Thus, for example, the OCV values at pH=8.5 does not indicate that ~100% of the mixed potential is due to the BOR. It merely indicates that the local reaction site pH is approx. 13.5 and provides direct evidence of the formation of PMBI that permitted a sharp pH gradient across it. Thus, FIG. 2 provides evidence for strong, localized pH gradients—OCV variation with pH for recessed planar electrode system.

Figure 3:
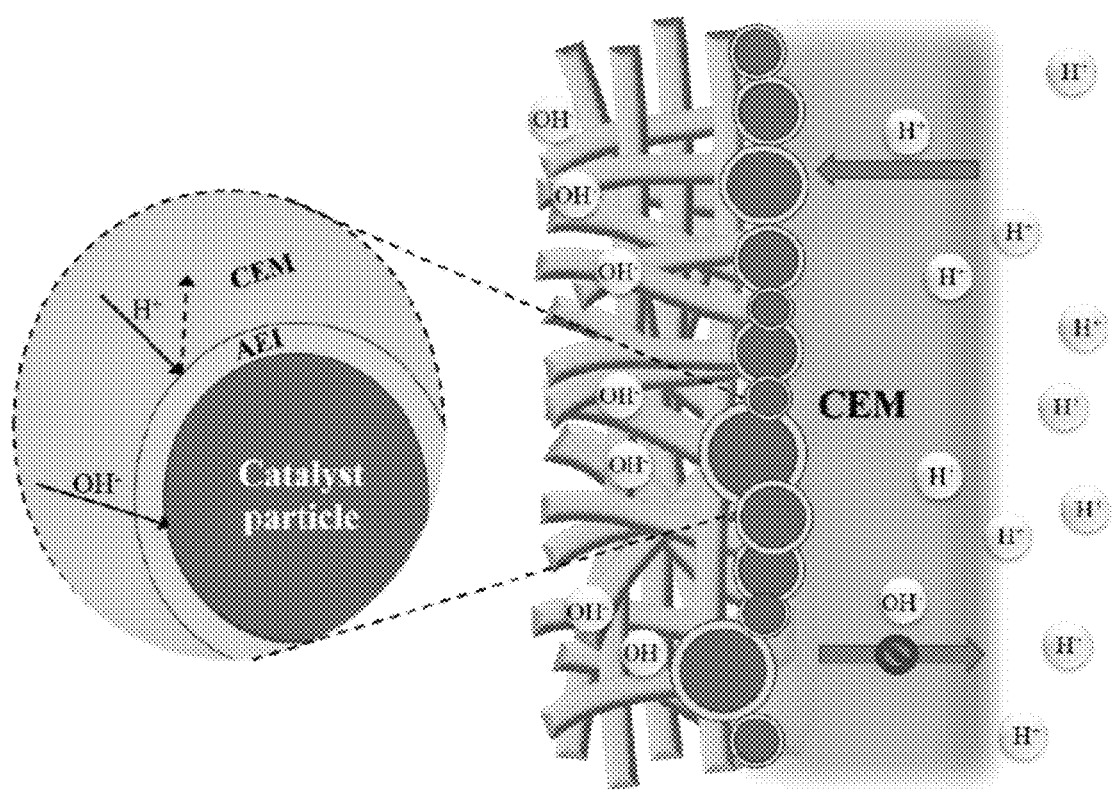
FIG. 3 depicts a general structure of the microscale bipolar interface.

FIG. 3 depicts a general structure of the microscale bipolar interface. The AEI covers the surface of the Pd/C catalyst, providing alkaline conditions for the BOR From the discussion above, the pH value on the surface of electrocatalyst was estimated to be 13.5. Assuming zero permselectivities for the H⁺ and OH⁻ in case of the AEI and the CEM respectively, the pH inside the microscale bipolar interface should be 7.0. The thickness of the AEI covering the surface of the anode was approximately estimated from the measured B.E.T. surface area of the Pd/C catalysts (84 m²/g) and the AEI loading (30%) and AEI film density. The AEI was assumed to be distributed uniformly through the surface of the material, and the density of the AEI film was estimated to be 0.83 g/ml. The calculated film thickness was about 6.2 nm, which was in reasonable agreement with values measured with electron tomography for CEM-based electrodes with similar binder loadings (7.2-7.6 nm). The pH gradient across the interface was therefore 1.05 pH units per nm. This value of the pH gradient would translate to the anode catalyst layer of DBFC as the binder loading in the catalyst ink used in the RPE experiment was the same as that used to make the DBFC membrane electrode assembly. These pH-gradient-enabling interfaces were then deployed in DBFCs and the performance of the DBFCs were optimized as described below.

FIG. 4A-FIG. 4C depict the polarization curves obtained from DBFC experiments together with the configuration schemes employed. FIG. 4A is a polarization curve for a DBFC with an all-CEM configuration that included an acid anode, CEM separator and an acid cathode. FIG. 4B is a polarization curve for a DBFC with an all-AEM configuration that included an alkaline anode, AEM separator and an alkaline cathode. FIG. 4C is a polarization curve for a DBFC with a pH-gradient-enabled microscale bipolar interface configuration that included an alkaline anode, CEM separator and an acid cathode.

The DBFC with a PMBI configuration yielded the best performance with an OCV of 1.8 V and a peak power density of approximately 300 mW/cm² (see e.g., FIG. 4C). The OCV was quite close to the thermodynamic redox cell voltage for the overall reaction (2.20 V, after taking the junction potential into account). The 400 mV deviation between the experimental OCV and theoretical OCV for the DBFC with PMBI configuration was attributed to the side reactions of borohydride hydrolysis and hydrogen oxidation, giving rise to a mixed potential. The DBFC with the CEM configuration yielded the lowest OCV (1.3 V, very close to the H₂/O₂ system, indicating that borohydride hydrolysis occurred first followed by hydrogen oxidation) with a peak power density approximately 50 mW/cm² (see e.g., FIG. 4A). As for the DBFC with the all AEM configuration, an OCV of 1.7 V was obtained along with a peak power density approximately 280 mW/cm² (see e.g., FIG. 4B). However, since large amounts of hydroxide and borohydride crossed over from the anode to the cathode through the AEM, the acid in the cathode side was neutralized and it was difficult to maintain the acidic conditions necessary to avoid hydrogen peroxide disproportionation. The performance of the DBFC with the AEM configuration was slightly lower than DBFC with the PMBI configuration, but the alkali crossover in the former presented an important (and intractable) operational drawback. Hence, it can be concluded that the sharp pH gradient enabled by the PMBI configuration offered the only solution to secure high performance.

Figure 5:
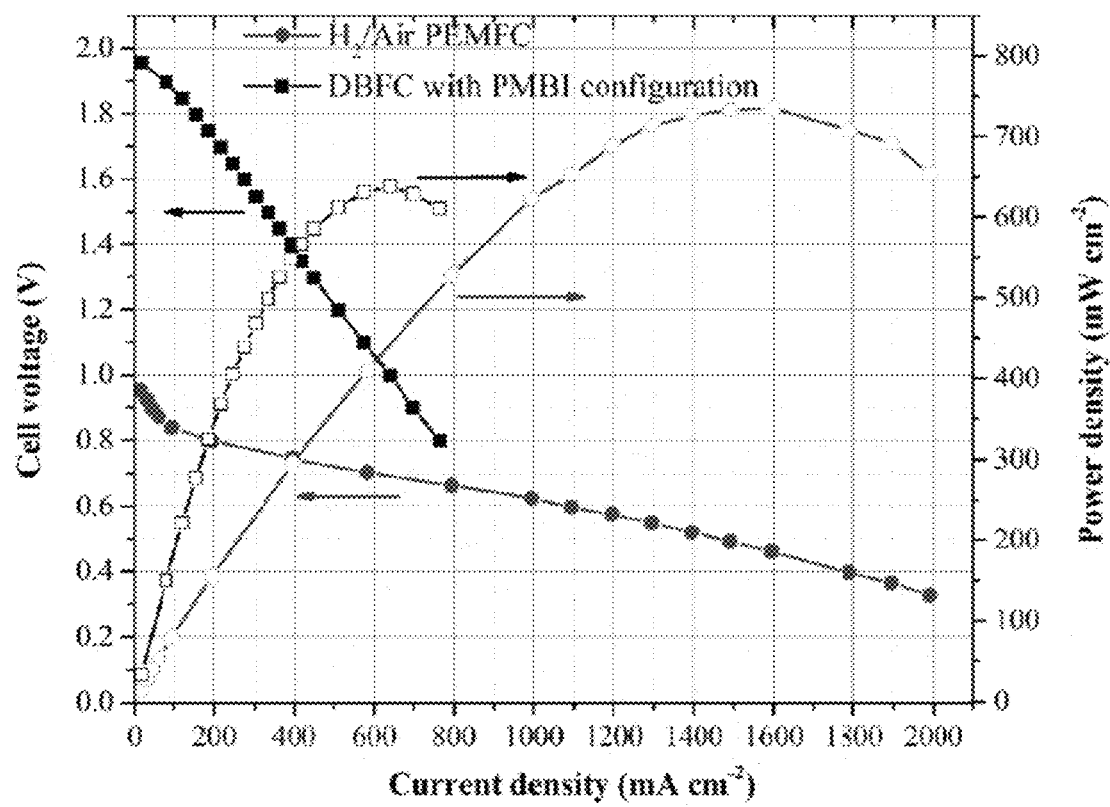
FIG. 5 depicts performance of DBFC (5 cm$^2$ active-area) with a pH-gradient-enabled microscale bipolar interface (PMBI) configuration as function of separator membrane thickness.

FIG. 5 depicts performance of DBFC (5 cm² active-area) with a pH-gradient-enabled microscale bipolar interface (PMBI) configuration as function of separator membrane thickness. The PMBI with the Nafion®117 separator showed best performance when compared with Nafion®112 and Nafion®115 separators. This can be attributed to the larger permeation of borohydride ions when using thinner separators. The cell was then scaled up from a 5-cm² to a 25-cm² active area cell and the loading of catalyst was increased to 3 mg$_{metal}$/cm².

Figure 6:
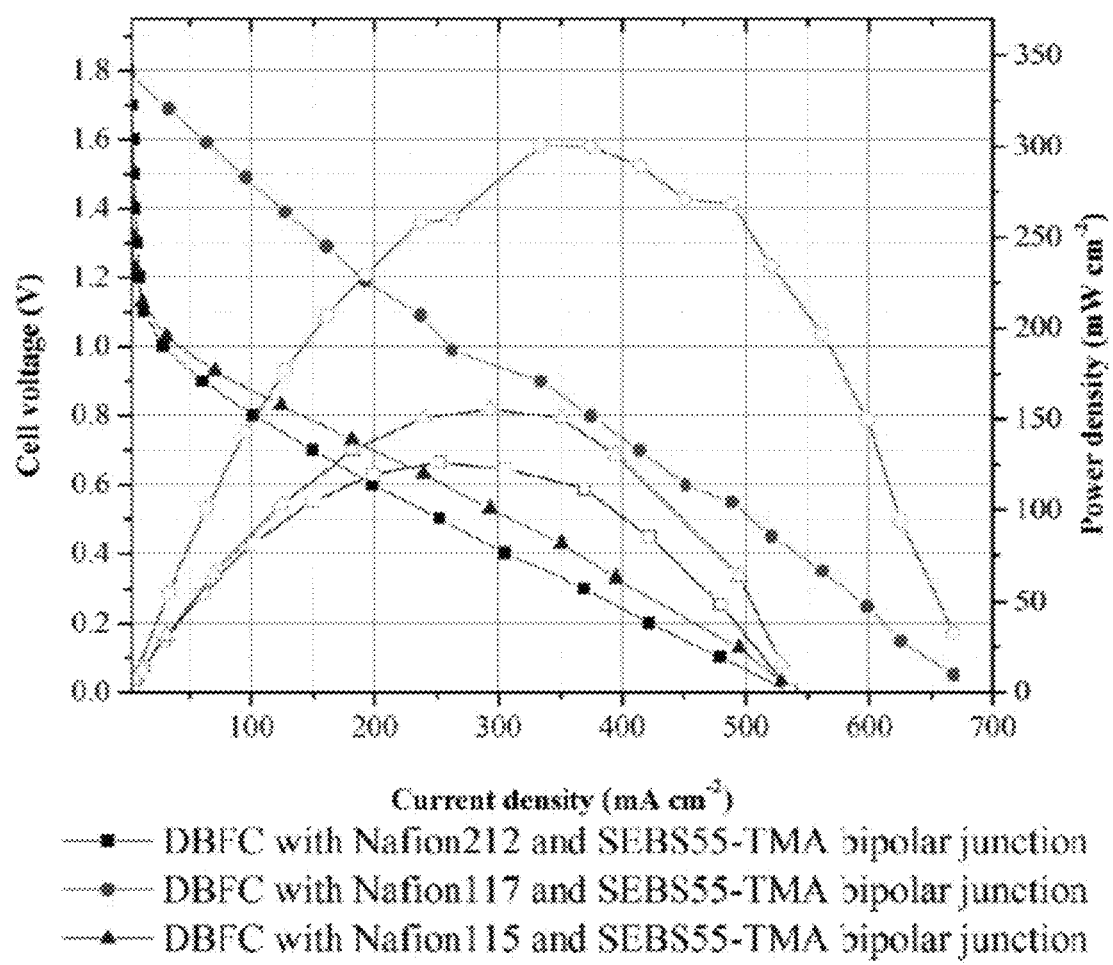
FIG. 6 depicts performance of a DBFC with a PMBI configuration in a 25 cm$^2$ active-area cell as a function of flow rates.

FIG. 6 depicts performance of a DBFC with a PMBI configuration in a 25 cm² active-area cell as a function of flow rates. Flow rates for both the anolyte and catholyte were varied systematically from 0.8 to 4.8 ml min$^{-1}$ cm$^{-2}$ to optimize the power output. When the flow rates were enhanced from 0.8 to 4.0 ml min$^{-1}$ cm$^{-2}$, there was a significant improvement in DBFC performance in terms of peak power density (from 225 to 610 mW/cm²). Further increase in the flow rate from 4.0 to 4.8 ml min$^{-1}$ cm$^{-2}$, yielded a limited enhancement in DBFC performance (peak power density increased from 610 to 630 mW/cm²).

Figure 7:
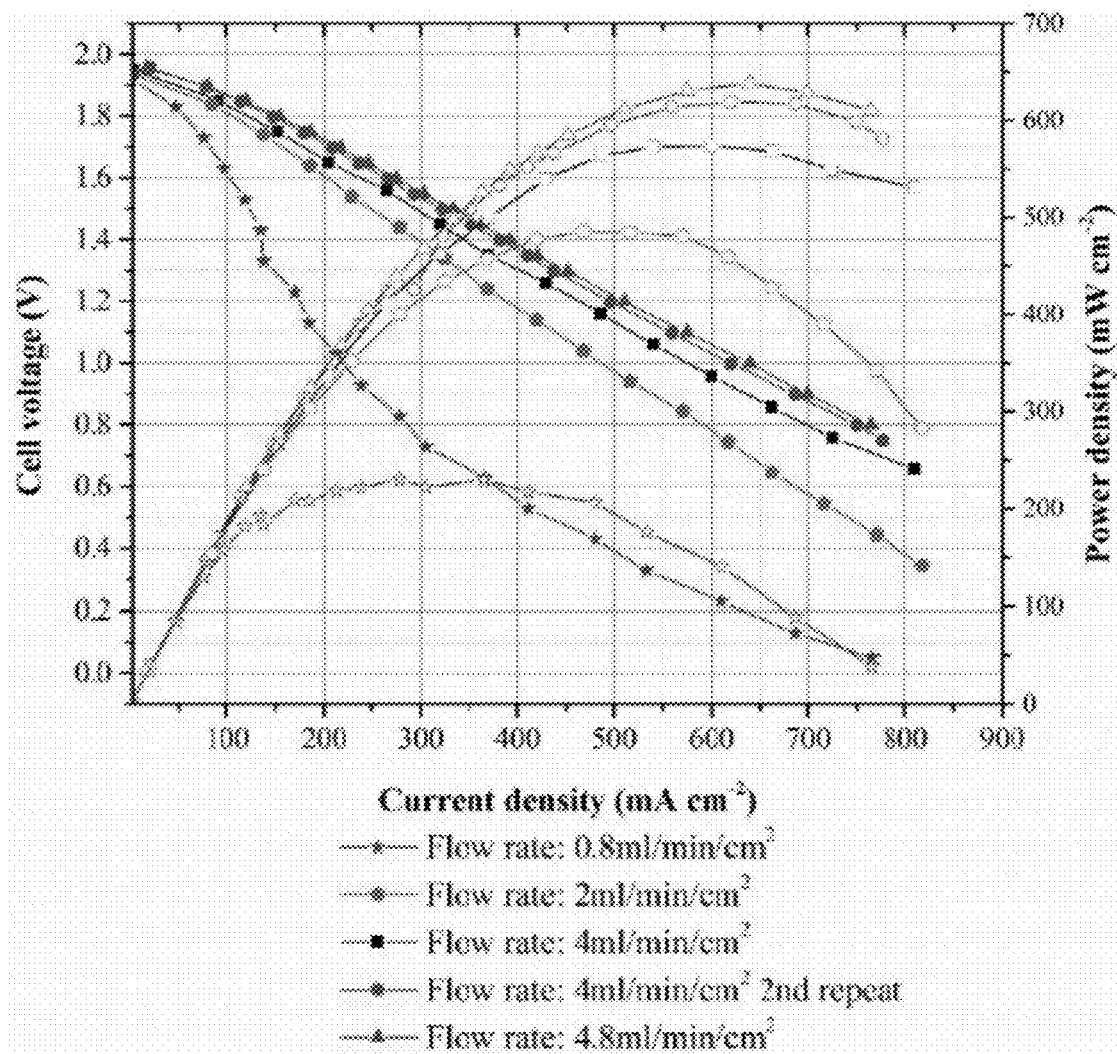
FIG. 7 depicts a comparison of polarization curves for a scaled up (25-cm$^2$) DBFC with pH-gradient-enabled microscale bipolar interphase configuration and a known, state-of-the-art PEMFC.

FIG. 7 depicts a comparison of polarization curves for a scaled up (25-cm²) DBFC with pH-gradient-enabled microscale bipolar interphase configuration and a known, state-of-the-art PEMFC. State-of-the-art DBFC performance using the PMBI configuration operated with flow rate of 4.8 ml min$^{-1}$ cm$^{-2}$ was obtained, with an OCV of 1.95 V and a peak power density of 630 mW/cm². A current density of 330 mA/cm² was obtained at 1.5 V (approximately 500 mW/cm²), which is perhaps the best performance reported in the literature for a DBFC at a voltage of 1.5 V. Whereas a PEMFC (H₂/air, unpressurized) yielded a power density of about 410 mW/cm² at 0.70 V, our DBFC with the PMBI configuration provides a 20% higher power density than this state-of-the-art PEMFC, but at double the operating voltage. The high-voltage operation without compromise on power density will help reduce costs of fuel cell stacks by simplifying stack design considerably. Doubling the cell voltage could conceivably reduce the number of cells by a factor of 2 without compromising overall power output (current scales with cell area, where there is much flexibility), while still enabling seamless integration with motors and other accessories at the rated stack voltage.

Figure 8A:
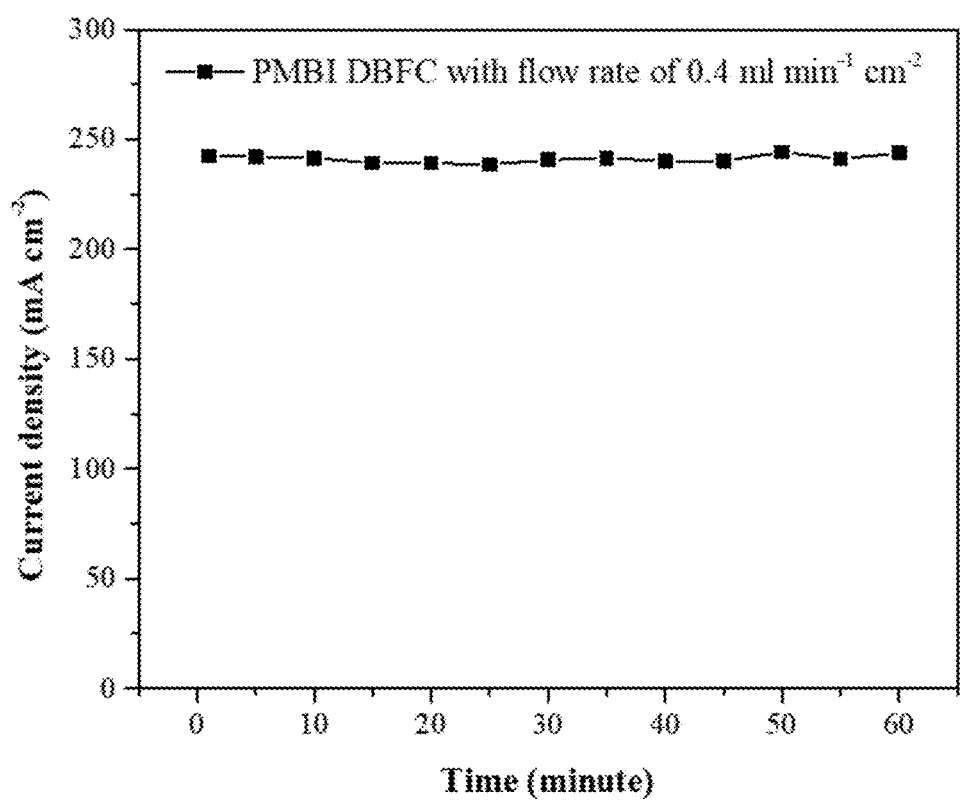
FIG. 8A-8B depict the stability of the DBFC with pH-gradient-enabled microscale bipolar interphase configuration. (A) In situ DFBC stability tests performed in an operating fuel cell by holding the cell at a constant voltage of 1.0 V for 60 minutes. (B) Polarization curves were acquired before and after this ex situ treatment.
Figure 8B:
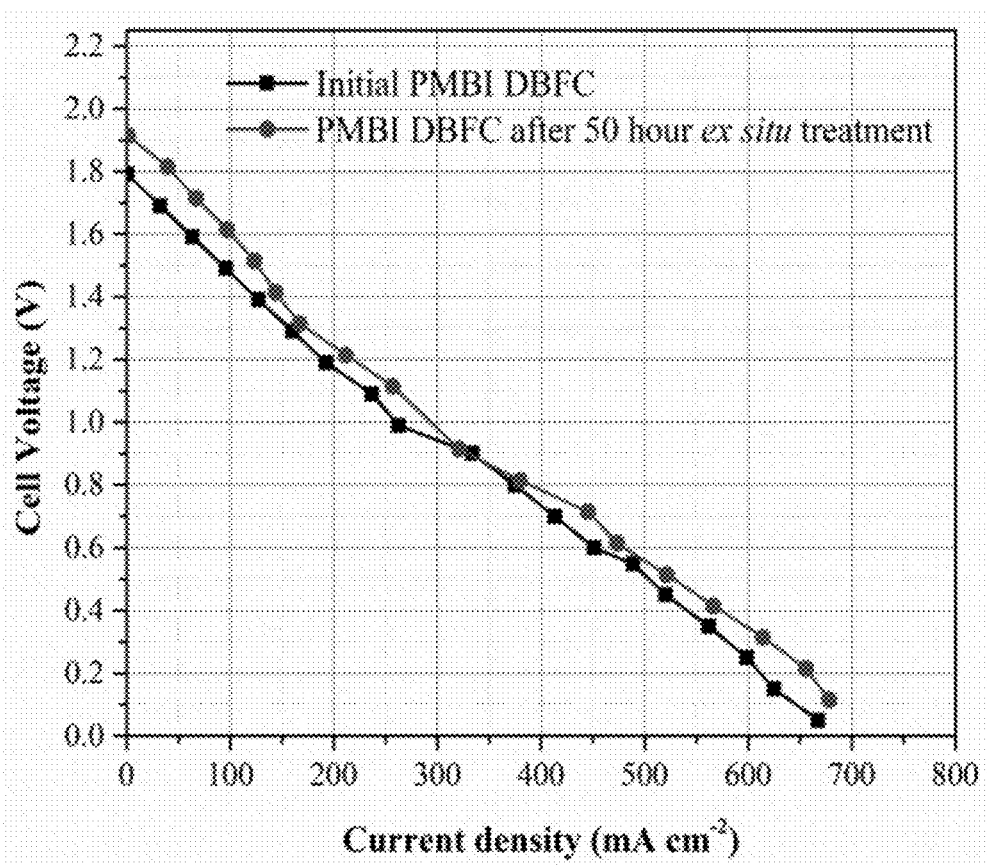

FIG. 8 depicts the stability of the DBFC with pH-gradient-enabled microscale bipolar interphase configuration. In situ DFBC stability tests were performed in an operating fuel cell by holding the cell at a constant voltage of 1.0 V for 60 minutes (see e.g., FIG. 8A). There was no apparent current decay observed for the DBFC with pH-gradient-enabled microscale bipolar interface (PMBI). Ex situ accelerated cell stability tests were performed by immersing the anode into a 3 M KOH solution at 70° C. for 50 hours and cathode into 1.5 M H₂SO₄ solution at 70° C. for 50 hours. Polarization curves were acquired before and after this ex situ treatment (see e.g., FIG. 8B). The initial and final polarization curves were compared to ascertain the MEA component stability under this accelerated test. The DBFC with PMBI configuration was completely stable for at least 50 hours upon exposure to the corresponding electrolyte media.

A pH-gradient-enabled microscale bipolar interface (PMBI) configuration was developed by employing a highly conductive anion exchange ionomer as the anode binder, Nafion® as the cathode binder and Nafion® 117 as the membrane separator. The ability of the PMBI configuration to maintain a sharp pH gradient was experimentally demonstrated by the measurement of OCV change as a function of pH using a novel RPE setup. The PMBI were conclusively shown to enable a pH gradient of 1.05 pH units per nm at the electrocatalytic reaction sites. This configuration was translated to the anode of a DBGC and yielded significantly improved performance as compared to either all-anion-exchange or all-cation-exchange configurations. The PMBI-based DBFC yielded a current density of 330 mA/cm² at 1.5 V and a peak power density of 630 mW/cm² at 1 V. The high OCV (1.95 V) and high performance at high voltage were attributed to the effective separation of anolyte and catholyte locally at the electrocatalytically active sites.

Materials

Chlorotrimethylsilane (99%), KOH (90%), chlorobenzene (99.5%), tin(IV) chloride (99.995%), chloroform (99.5%), methanol (99.9%), paraformaldehyde (99.5%), silver nitrate (0.1 N), potassium thiocyanate (0.1 N), sodium nitrate (99%), chloroform-d (99.96%), 1-methyl-2-pyrrolidinone (NMP, 99.7%), trimethylamine solution (TMA; 31%-35% weight percent in ethanol) and sulfuric acid (95%), hydrogen peroxide solution (30% weight percent in H₂O), Nafion® perfluorinated resin solution (5% weight percent in lower aliphatic alcohols and water) were purchased from Sigma Aldrich. polystyrene-block-poly(ethylene-ran-butylene)-block-polystyrene (SEBS; 55:45 molar ratio of styrene to rubber) was sourced from Kraton. Ni foam was purchased from MTI Corporation. 46.5% Pt on Vulcan was purchased from TANAKA K. K. 40% Pd on Vulcan was purchased from Premetek Corporation. GDL 24AA (diffusion media) was purchased from Ion Power.

Ion Exchange Capacity and Ionic Conductivity

The IECs of membranes in chloride form were determined by the Volhard titration method. A vacuum dried SEBS-based AEM in the chloride form (dried at <0.1 in Hg at 60° C. for 12 hours) was weighed (about 0.1 g) and immersed in 20 mL of 1 M sodium nitrate for 48 h at room temperature. Subsequently, 5.0 ml of 0.1 M silver nitrate was added to precipitate the chloride ions. An excess of silver was added to assure the complete precipitation of the chloride (a white silver chloride precipitate was observed if the membrane had any IEC). Then, 2-3 drops of 11 wt % iron (III) nitrate in DI water were added as indicator to detect the endpoint during the titration of the silver ions with thiocyanate. The solution was titrated with 0.1 M potassium thiocyanate (0.1 M KSCN, standard solution) until the color changed from a light orange to a medium-dark orange color (equivalence point). A control sample was prepared by mixing 20 mL of 1 M NaNO₃ with 5.0 mL of 0.1 M AgNO₃ and 2-3 drops of 11 wt % of Fe(NO₃)₃. The control was also titrated with 0.1 M KSCN and the difference in volume used to titrate the control solution and the sample solution was used for calculating the IEC according to Eqn. 3:

$$IEC_{Cl^-}\ [\text{mmol g}^{-1}] = \frac{(Vol_{cont.} - Vol_{test}) \cdot 100\ mM\ KSCN}{wt_{dry}} \quad (3)$$

where $IEC_{Cl^-}$ was the experimental ion-exchange capacity (mmol g$^{-1}$); $Vol_{cont.}$ was the volume of 0.1 M KSCN used to titrate the control sample (ml); $Vol_{test}$ was the volume of 0.1 M KSCN used to titrate the sample (ml); and $Wt_{dry}$ was the weight of the AEM (g).

NMR Characterization of the Polymers

NMR measurements were carried out on a Varian Unity Plus-300 MHz NMR spectrometer. The samples were prepared by dissolving 20-40 mg of polymer in 1 ml of deuterated solvent, and adding 35 µL of tetramethylsilane (TMS) as internal standard for calibrating the chemical shift (δ=0 ppm for $^1$H). Further details of the methods employed can be found in our previous works.

FIG. 9 depicts the $^1$H NMR of CMSEBS55. The DF for this polymer was calculated to be 0.31 mol/mol. The theoretical IECs (2.60 mmol/g) calculated (from the relative areas of $^1$H NMR peaks "e" and "b") for CMSEBS55 is shown in FIG. 9. CMSEBS55 was reacted with TMA to obtain the following AEIs: SEBS55-TMA. Since SEBS-based AEI could not be dissolved in common deuterated solvents, it was not possible to characterize the reaction products using NMR spectroscopy. Instead, FTIR was employed to confirm the generation of affixed quaternary ammonium groups by quaternization of the chloromethylated SEBS.

Ionic Conductivity

In-plane ionic conductivity measurements were carried out in a 4-point conductivity cell (BT-110, Scribner Associates) using electrochemical impedance spectroscopy (EIS) to measure the resistance. A 1 cm×3 cm membrane was placed in the PTFE conductivity cell in contact with the 4 platinum electrodes and immersed in a temperature controlled DI water bath. A Gamry series G750 potentiostat was used to measure the impedance in the frequency range 100 kHz to 0.1 Hz. The high frequency resistance was estimated from the Bode plots (corresponding to a phase angle of zero). The membrane conductivity was calculated using Eqn. 3:

$$\sigma = \frac{L}{R \cdot t \cdot w} \quad (3)$$

where σ was the in-plane membrane conductivity (mS cm-1); R was the in-plane membrane resistance (mOhm); t was the membrane thickness (fully hydrated) (cm); w was the membrane width (fully hydrated) (cm); L was the distance between the two inner electrodes (cm).

The hydroxide and chloride ions conductivity were tested for SEBS55-TMA (see e.g., FIG. 10B). A very large hydroxide ion conductivity (210 mS/cm) was obtained by SEBS55-TMA at 70° C. Also, a very large chloride ion conductivity (110 mS/cm) was achieved by SEBS55-TMA at the same temperature. Our previous synthesized AEM material (SEBS30-TMA) has an IEC of 1.35 mmol/g and a hydroxide ion conductivity of 110 mS/cm at 70° C. SEBS55-TMA has almost twice hydroxide ion conductivity than SEBS30-TMA. The high ion conductivities of SEBS55-TMA are attribute to microphase separation at the molecular level. Phase separation morphology of tri-block copolymer (SEBS55-TMA) was confirmed by AFM (see e.g., FIG. 10A). The size of ionic domains (dark domain of FIG. 10A) is approximately 32~36 nm. From previous study, the ionic domains of SEBS30-TMA are approximately 58~95 nm. With the increase of IEC, SEBS55-TMA has formed more uniform and narrower ionic domains compared with that of SEBS30-TMA. Though large ionic domain attributes to large ion conductivity, the ratio of ionic domains to non-conducting rubber domains (bright domain of FIG. 10A) of SEBS55-TMA is much higher than that of SEBS30-TMA.

FTIR Spectroscopy

The presence of functional groups was qualitatively confirmed by using FTIR spectroscopy. FTIR was performed using membrane films in a Bruker Tensor 27 instrument. The data was collected continuously in the range 4000 to 400 cm$^{-1}$ at a resolution of 8 cm$^{-1}$. All the samples were dried in a vacuum oven (at 60° C. for 12 hours) before the measurement to minimize the presence of water. Appropriate background corrections were also performed.

Figure 11:
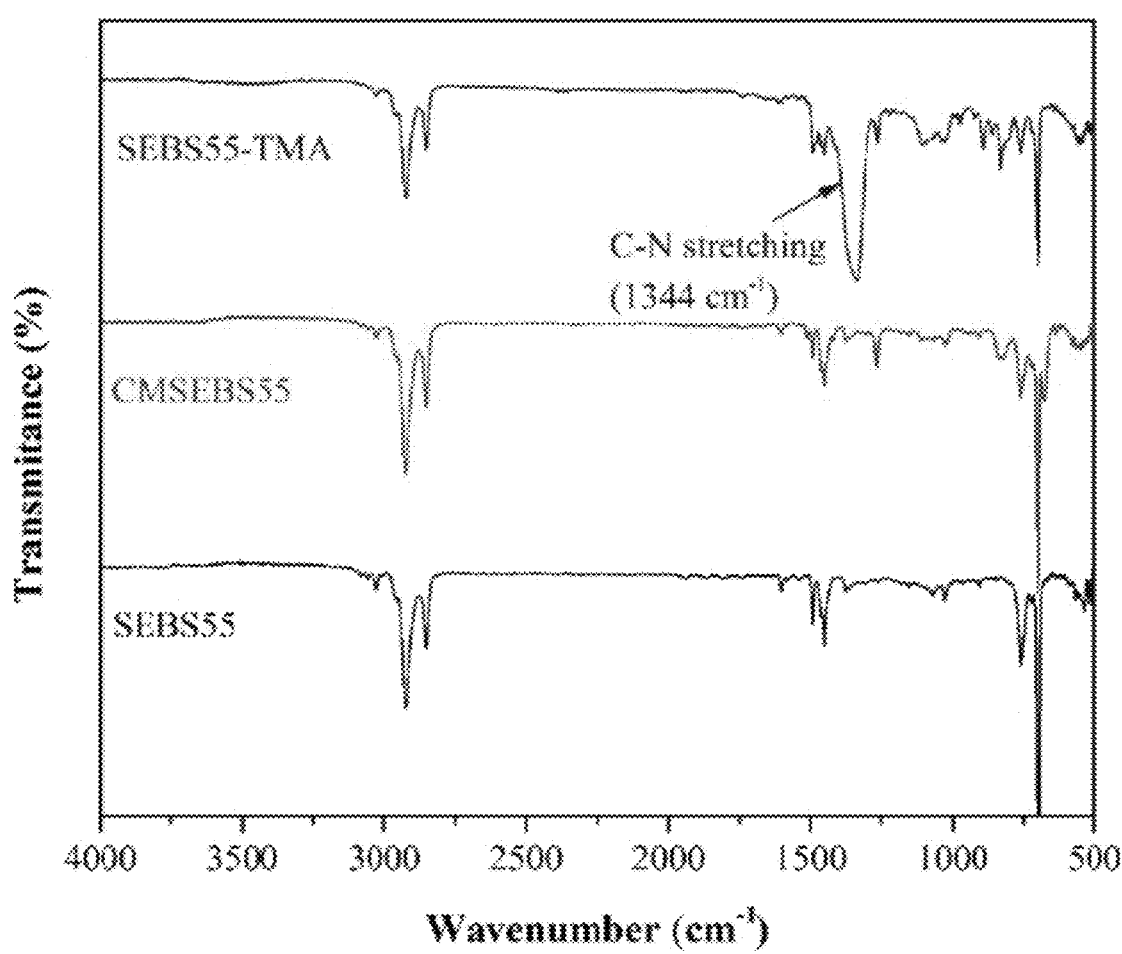
FIG. 11 depicts the FTIR spectra of SEBS, CMSEBS55 and SEBS55-TMA.

FIG. 11 shows the FTIR spectra of SEBS, CMSEBS55 and SEBS55-TMA. A FTIR peak appearing at approximately 1344 cm$^{-1}$ was assigned to the C—N bond stretching, confirming the formation of SEBS55-TMA. Similar results were observed for SEBS-based AEM. Moreover, IEC determination confirmed the quaternization of CMSEBS and the completion of the reaction. Experimental IEC (2.11 mmol/g) was confirmed by Volhard titration, as shown in Table 1 below. The quaternization reaction of the CMSEBS55 yield was 81.2%.

TABLE 1

| AEI | Theoretical IEC (From $^1$H NMR) (mmol Cl$^-$/g) | In exchange capacity (mmol/g) | Hydroxide ion conductivity (@70° C., mS/cm) | Chloride ion conductivity (@70° C., mS/cm) |
|---|---|---|---|---|
| SEBS55-TMA | 2.6 | 2.11 ± 0.05 | 210 | 110 |

Scanning Electron Microscopy

The Pd/C deposited on Ni foam electrode and Pt/C deposited on the GDL 24AA electrode were characterized using a SEM (FEI Nova 230) equipped with an EDX analyzer. The beam energy used was 10 kV, the chamber pressure was 9×10$^{-3}$ Pa and the chamber temperature was 23° C.

Figure 12A:
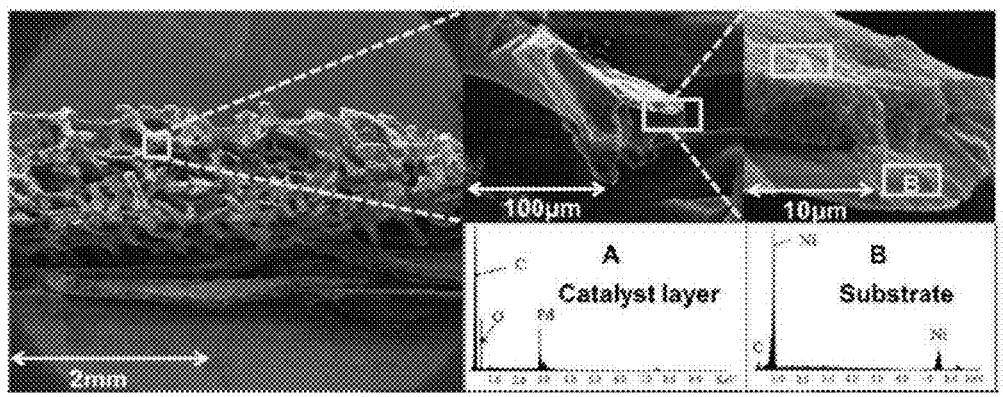
FIG. 12A-12B depict the cross-sectional view of the (A) anode and (B) cathode obtained by SEM.
Figure 12B:
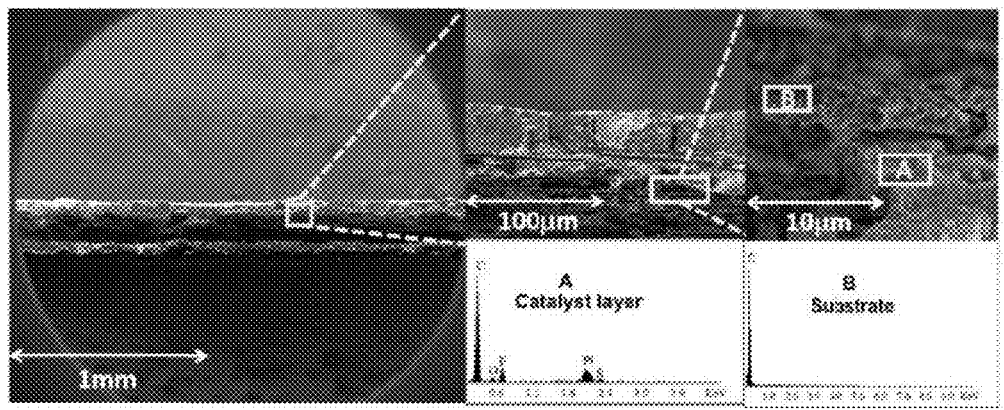

FIG. 12A and FIG. 12B show the cross-sectional view of the anode and cathode obtained by SEM. For the anode (see e.g., FIG. 12A), Pd was deposited uniformly onto the surface of nickel foam. The thickness of catalyst layer was 5-6 μm. There are two competing reaction (electro-oxidation and electrolysis of borohydride ions) happening when borohydride ions diffuse on the catalyst layer. The electrolysis of borohydride results in the formation of $H_2$. The porous structure of nickel foam is helpful to exclude the $H_2$ bubble and make catalyst site active for borohydride. Moreover, the porous structure of nickel foam can increase the mass transfer for the liquid sodium borohydride fuel. The cathode image is shown in FIG. 12B. Pt was deposited onto hydrophilic microporous carbon layer, which favored enhanced water flux to the cathode.

Atomic Force Microscopy

The membranes morphology was investigated by tapping mode with a Bruker Dimensions ICO AFM. A PFQNE-AL probe (Bruker) with a cantilever spring constant of 0.8 N m$^{-1}$, and a tip radius of 5 nm was employed in the experiments. Imaging was performed using at ambient temperature and relative humidity using PF-TUNA software module. The AFM samples were prepared by casting an chloromethylated SEBS55 solution on a platinum plate to form a very thin film, then, immersed in 1 ml of 4 M TMA ethanolic solution in 10 ml of NMP to quaternize the chloromethylated groups (at 30° C. for two days). The AEIs evaluated in the present work were tested in the chloride form.

EQUIVALENTS AND SCOPE

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about" In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are openended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

What is claimed is:

1. A method of inducing or providing a pH gradient in an electrochemical or a chemical system comprising:
    (i) coating a first catalytic particle, a plurality of catalytic particles, or a catalytic film with an ion exchange ionomer, resulting in a first ionomer-coated catalytic particle, a first ionomer-coated plurality of catalytic particles, or a first ionomer-coated catalytic film;
    (ii) placing the first ionomer-coated catalytic particle, the first ionomer-coated plurality of catalytic particles, or the first ionomer-coated catalytic film in contact with an ion exchange membrane (IEM);
    (iii) coating a second catalytic particle, a plurality of catalytic particles, or a catalytic film with an ion exchange ionomer, resulting in a second ionomer-coated catalytic particle, a second ionomer-coated plurality of catalytic particles, or a second ionomer-coated catalytic film; and
    (iv) placing the second ionomer-coated catalytic particle, the second ionomer-coated plurality of catalytic particles, or the second ionomer-coated catalytic film in contact with the IEM;
    wherein
    the IEM is a cation membrane (CEM) or an anion exchange membrane (AEM);
    the first ionomer-coated catalytic particle, ionomer-coated plurality of particles, or ionomer-coated catalytic film is an anion exchange ionomer (AEI)-coated catalytic particle, AEI-coated plurality of catalytic particles, or AEI-coated catalytic film; and
    the second ionomer-coated catalytic particle, ionomer-coated plurality of catalytic particles, or ionomer-coated catalytic film is a cation exchange ionomer (CEI)-coated catalytic particle, CEI-coated plurality of catalytic particles, or CEI-coated catalytic film;
    the AEM or AEI comprises a material selected from one or more of the group consisting of polystyrene-block-poly(ethylene-ran-butylene)-block-polystyrene triblock copolymer-based backbone, poly (phenylene oxide)-based backbone, polysulfone-based backbone, poly(N,N-diallylazacycloalkane)-based backbone, bromoalkyl-tethered poly(biphenyl alkylene)-based backbone, multiblock copoly(arylene ether)-based backbone, poly (vinylbenzyl chloride)-based backbone, and cardo-polyetherketone-based backbone; and the material comprises a functional group selected from one or more of the group consisting of benzyl-trimethylammonium, benzyl-imidazolium, guanidium, benzyl-tris (2, 4, 6-trimethoxyphenyl) phosphonium, permethyl cobaltocenium, 1,4-dimethylpiperazinium, and benzyl-trimethylphosphonium.

2. The method of claim 1, wherein the IEM is a CEM.

3. The method of claim 1, wherein the first or second catalytic particle, plurality of catalytic particles, or catalytic film comprises a material selected from one or more of the group consisting of Ni; CoO; a noble metal; a metal alloy thereof; a metal mixture thereof; and combinations thereof.

4. The method of claim 3, wherein the noble metal is Ag, Au, Ir, Pd, or Pt.

5. The method of claim 1, wherein the CEM or CEI comprises a material selected from one or more of the group consisting of a perfluorosulfonic acid (PFSA)/polytetrafluoroethylene (PTFE) copolymer, sulfonated polystyrene-block-poly(ethylene-ran-butylene)-block-polystyrene tri-block copolymer, sulfonated poly (phenylene oxide), sulfonated poly(quinoxaline), poly(ethylene-co-tetrafluoroethylene)-graft-poly(styrene sulfonic acid), poly(vinylidene fluoride)-graft-poly(styrene sulfonic acid), sulfonated poly (arylene ether ketone), sulfonated poly(4-phenoxybenzoyl-1,4-phenylene), and sulfonated polysulfone.

6. The method of claim 1, further comprising
introducing either a reducing agent or an oxidizing agent to a first electrode or a second electrode comprising a first ionomer-coated catalytic film, a first ionomer-coated catalytic particle, or a first ionomer-coated plurality of catalytic particles; or
introducing either an oxidizing agent or a reducing agent to a second ionomer-coated catalytic film, a second ionomer-coated catalytic particle, or a second ionomer-coated plurality of catalytic particles.

7. The method of claim 6, wherein,
the first electrode and the second electrode are separated by the IEM;
a reaction with a reduced or oxidized species from the first electrode and an oxidized or reduced species from the second electrode occurs at an interface between the the first or second ionomer-coated catalytic film, the first or second ionomer-coated catalytic particle, or the first or second ionomer-coated plurality of catalytic particles and the IEM, wherein the reaction results in splitting water, forming water, forming compounds produced by half-cell reactions occurring at the first electrode and the second electrode, or forming a compound produced by an overall full cell reaction;
the reducing agent comprises a material selected from one or more of the group consisting of: sodium borohydride, methanol, hydrazine, hydrogen, water, and ethanol; or
the oxidizing agent comprises a material selected from one or more of the group consisting of hydrogen peroxide, water, and oxygen.

8. The method of claim 6, wherein the reducing agent or the oxidizing agent is fed contacted with the first electrode or the second electrode in a single-pass mode or in a recycle mode.

9. The method of claim 1, wherein the CEI comprises a material selected from one or more of the group consisting of sulfonated polystyrene-block-poly(ethylene-ran-butylene)-block-polystyrene tri-block copolymer, perfluorosulfonic acid (PFSA)/polytetrafluoroethylene (PTFE) copolymer solution, sulfonated poly (phenylene oxide), sulfonated polysulfone, sulfonated poly (arylene ether ether ketone), and sulfonated poly(4-phenoxybenzoyl-1,4-phenylene).

10. The method of claim 1, wherein the ion exchange ionomer coating:
(i) increases the pH gradient between the IEM and the first or second ionomer-coated catalytic film, the first or second ionomer-coated catalytic particle, or the first or second ionomer-coated plurality of catalytic particles compared to the pH gradient without the ion exchange ionomer coating;
(ii) provides a pH gradient of about 1 pH unit per nm between the IEM and the first or second ionomer-coated catalytic film, the first or second ionomer-coated catalytic particle, or the first or second ionomer-coated plurality of catalytic particles; or
(iii) prevents catholyte contact with an anode active site.

11. A method of electrochemical conversion from combining a reducing agent and an oxidizing agent, comprising:
introducing either a reducing agent or an oxidizing agent to a first electrode comprising a first catalyst coated by a first ion exchange ionomer; or
introducing either an oxidizing agent or a reducing agent to a second electrode comprising a second catalyst coated by a second ion exchange ionomer
wherein
the first electrode and the second electrode are separated by an ion exchange membrane (IEM);
the IEM is a cation exchange membrane (CEM) or an anion exchange membrane (AEM);
the first ion exchange ionomer and second ion exchange ionomer are independently selected from an anion exchange ionomer (AEI) or a cation exchange ionomer (CEI);
the AEM or AEI comprises a material selected from one or more of the group consisting of a polystyrene-block-poly(ethylene-ran-butylene)-block-polystyrene tri-block copolymer-based backbone, poly (phenylene oxide)-based backbone, polysulfone-based backbone, poly(N,N-diallylazacycloalkane)-based backbone, bromoalkyl-tethered poly(biphenyl alkylene)-based backbone, multiblock copoly(arylene ether)-based backbone, poly (vinylbenzyl chloride)-based backbone, and cardo-polyetherketone-based backbone; and
the material comprises a functional group selected from one or more of the group consisting of benzyl-trimethylammonium, benzyl-imidazolium, guanidium, benzyl-tris (2,4, 6-trimethoxyphenyl) phosphonium, permethyl cobaltocenium, 1,4-dimethylpiperazinium, and benzyl-trimethylphosphonium.

12. The method of claim 11, wherein a reaction with a reduced or oxidized species from the first electrode and an oxidized or reduced species from the second electrode occurs at an interface between the first catalyst coated by a first ion exchange ionomer or the second catalyst coated by a second ion exchange ionomer and the IEM, wherein the reaction results in splitting water, forming water, forming compounds produced by half-cell reactions occurring at the first electrode and the second electrode, or forming a compound produced by an overall full cell reaction.

13. The method of claim 11, wherein
the first catalyst is a metallic or a non-metallic particle or a metallic or a non-metallic film comprising a first material selected from the group consisting of Ni; CoO; a noble metal; a metal alloy thereof; a metal mixture thereof; and combinations thereof; or
the second catalyst is a metallic or a non-metallic particle or a metallic or a non- metallic film comprising a second material selected from the group consisting of Ni; CoO; a noble metal; a metal alloy thereof; a metal mixture thereof; and combinations thereof.

14. The method of claim 13, wherein the noble metal is Ag, Au, Ir, Pd, or Pt.

15. The method of claim 11, wherein the CEM or CEI comprises a material selected from one or more of the group consisting of a perfluorosulfonic acid (PFSA)/polytetrafluoroethylene (PTFE) copolymer, sulfonated polystyrene-block-poly(ethylene-ran-butylene)-block-polystyrene tri-block copolymer, sulfonated poly(phenylene oxide), sulfonated poly(quinoxaline), poly(ethylene-co-tetrafluoroethylene)-graft-poly(styrene sulfonic acid), poly(vinylidene fluoride)-graft-poly(styrene sulfonic acid), sulfonated poly(arylene ether ether ketone), sulfonated poly(4-phenoxybenzoyl-1,4-phenylene), and sulfonated polysulfone.

16. The method of claim 11, wherein the CEI comprises a material selected from one or more of the group consisting of sulfonated polystyrene-block-poly(ethylene-ran-butylene)-block-polystyrene tri-block copolymer, perfluorosulfonic acid (PFSA)/polytetrafluoroethylene (PTFE) copolymer solution, sulfonated poly (phenylene oxide), sulfonated polysulfone, sulfonated poly (arylene ether ether ketone), and sulfonated poly(4-phenoxybenzoyl-1,4-phenylene).

17. The method of claim 11, wherein
the reducing agent comprises a material selected from one or more of the group consisting of sodium borohydride, methanol, hydrazine, hydrogen, water, and ethanol; or
the oxidizing agent comprises a material selected from one or more of the group consisting of hydrogen peroxide, water, and oxygen.

18. The method of claim 11, wherein the reducing agent or the oxidizing agent is fed contacted with the first electrode and the second electrode in a single-pass mode or in a recycle mode.

19. The method of claim 11, wherein the first catalyst coated by the first ion exchange ionomer comprises a first ionomer-coated catalytic particle, a first ionomer-coated plurality of catalytic particles, or a first ionomer-coated catalytic film; wherein the second catalyst coated by the second ion exchange ionomer comprises a second ionomer-coated catalytic particle, a second ionomer-coated plurality of catalytic particles, or a second ionomer-coated catalytic film; and wherein the ion exchange ionomer coating:
(i) increases a pH gradient between the IEM and the first or second ionomer-coated catalytic film, the first or second ionomer-coated catalytic particle, or the first or second ionomer-coated plurality of catalytic particles compared to the pH gradient without the ion exchange ionomer coating;
(ii) provides a pH gradient of about 1 pH unit per nm between the IEM and the first or second ionomer-coated catalytic film, the first or second ionomer-coated catalytic particle, or the first or second ionomer-coated plurality of catalytic particles; or
(iii) prevents catholyte contact with an anode active site.

* * * * *